US011256387B1

(12) United States Patent
Huff et al.

(10) Patent No.: US 11,256,387 B1
(45) Date of Patent: Feb. 22, 2022

(54) MULTI-PLATFORM OMNI-CHANNEL CONTENT CREATOR

(71) Applicant: OPAL LABS INC., Portland, OR (US)

(72) Inventors: George M. Huff, Portland, OR (US); Benjamin Krogh, Portland, OR (US); Chris Campbell, Portland, OR (US); David Gorman, Portland, OR (US); Tim Wood, Sugar Grove, IL (US); Dan Barrett, Portland, OR (US); Brandon Showers, Portland, OR (US)

(73) Assignee: Opal Labs Inc., Portland, OR (US)

( * ) Notice: Subject to any disclaimer, the term of this patent is extended or adjusted under 35 U.S.C. 154(b) by 273 days.

(21) Appl. No.: 15/212,225

(22) Filed: Jul. 16, 2016

Related U.S. Application Data

(60) Provisional application No. 62/193,785, filed on Jul. 17, 2015.

(51) Int. Cl.
| | |
|---|---|
| *G06F 3/0482* | (2013.01) |
| *G06F 3/0486* | (2013.01) |
| *G06F 40/186* | (2020.01) |
| *G06F 3/0488* | (2013.01) |
| *G06F 3/0484* | (2013.01) |

(Continued)

(52) U.S. Cl.
CPC .......... *G06F 3/0482* (2013.01); *G06F 3/0486* (2013.01); *G06F 40/186* (2020.01); *H04L 12/1813* (2013.01); *H04L 65/4015* (2013.01); *G06F 2203/04803* (2013.01)

(58) Field of Classification Search
CPC ......... G06F 2203/04803; G06F 3/0482; G06F 3/0486; G06F 17/248; G06F 40/103; G06F 3/04883; G06F 3/0485; G06F 3/04842; G06F 40/166; H04L 65/4015; H04L 12/1813
See application file for complete search history.

(56) References Cited

U.S. PATENT DOCUMENTS

| | | | | |
|---|---|---|---|---|
| 8,250,527 | B1 * | 8/2012 | Gubbay | G06F 8/33 |
| | | | | 717/113 |
| 2004/0174392 | A1 * | 9/2004 | Bjoernsen | G06Q 10/10 |
| | | | | 715/751 |

(Continued)

*Primary Examiner* — Stephen S Hong
*Assistant Examiner* — Ahamed I Nazar
(74) *Attorney, Agent, or Firm* — Renaissance IP Law Group, LLP; David A. Crowther

(57) ABSTRACT

Embodiments of the inventive concept include a multi-platform omni-channel content creation and distribution system. The system includes a multi-platform media content data and logic structure, a user interface logic section configured to interface with a user and the multi-platform media content data and logic structure, and a multi-sectional view configured to be shown on a display. The multi-sectional view includes a metadata section in a first section thereof and a simulated true-to-life preview section in a second section thereof. The user interface logic section receives metadata information from the user. The metadata section displays the metadata information. The multi-platform media content data and logic structure causes the simulated true-to-life preview section to show a piece of content with exact proportional dimensions and appearance as it would appear under actual non-simulated real-world circumstances for a particular media platform and associated physical device.

20 Claims, 29 Drawing Sheets

(51) Int. Cl.
*G06F 40/103* (2020.01)
*G06F 40/166* (2020.01)
*H04L 12/18* (2006.01)
*H04L 65/401* (2022.01)

(56) References Cited

U.S. PATENT DOCUMENTS

| | | | | |
|---|---|---|---|---|
| 2007/0162846 | A1* | 7/2007 | Cave | G06F 16/958 715/210 |
| 2008/0155397 | A1* | 6/2008 | Bissonnette | G06F 40/14 715/256 |
| 2009/0254802 | A1* | 10/2009 | Campagna | G06F 40/186 715/209 |
| 2012/0036220 | A1* | 2/2012 | Dare | H04L 67/04 709/217 |
| 2012/0210210 | A1* | 8/2012 | Itoh | G06F 40/131 715/236 |
| 2014/0040725 | A1* | 2/2014 | Foster | G06F 40/143 715/234 |
| 2014/0222553 | A1* | 8/2014 | Bowman | G06Q 30/0276 705/14.45 |
| 2014/0229544 | A1* | 8/2014 | Evans | G06Q 50/01 709/204 |
| 2014/0304682 | A1* | 10/2014 | Taylor | G06F 9/44 717/113 |
| 2015/0077772 | A1* | 3/2015 | Satou | G06F 3/1208 358/1.9 |
| 2016/0291846 | A1* | 10/2016 | DeWeese | G06F 3/04815 |

* cited by examiner

MULTI-PLATFORM OMNI-CHANNEL CONTENT CREATOR

RELATED APPLICATION DATA

This application claims the benefit of U.S. Provisional Application Ser. No. 62/193,785, filed on Jul. 17, 2015, which is hereby incorporated by reference.

TECHNICAL FIELD

This application pertains to content creation, and more particularly, to a multi-platform omni-channel media content creator including an in-line editor and true-to-life preview methods and logic.

BACKGROUND

It is challenging for businesses to create and distribute coherent and effective branding messages or other information to their customers because of the disparate nature of the various media platforms. Maintaining consistent brand messaging across disparate channels (e.g., social, email, web, print, retail, billboard, or the like) and keeping up with the total volume of content created are difficult tasks when relying on conventional tools. Each channel can have various media platforms with different layouts, which can even vary within a particular platform across different kinds of devices such as a smart phone, a tablet, or a desktop computer. The complexity of the media environment often results in duplicated efforts, misaligned or sloppy content, and ineffective campaigns. Building and maintaining a loyal customer base can therefore be a monumental task using conventional techniques.

Accordingly, a need remains for improved methods and systems for multi-platform media content creation and distribution. Embodiments of the inventive concept address these and other limitations in the prior art.

BRIEF DESCRIPTION OF THE DRAWINGS

FIGS. 11 through 29 illustrate various example embodiments of the multi-platform omni-channel media content creator of FIG. 1 in accordance with various embodiments of the present inventive concept.

Figure 1:
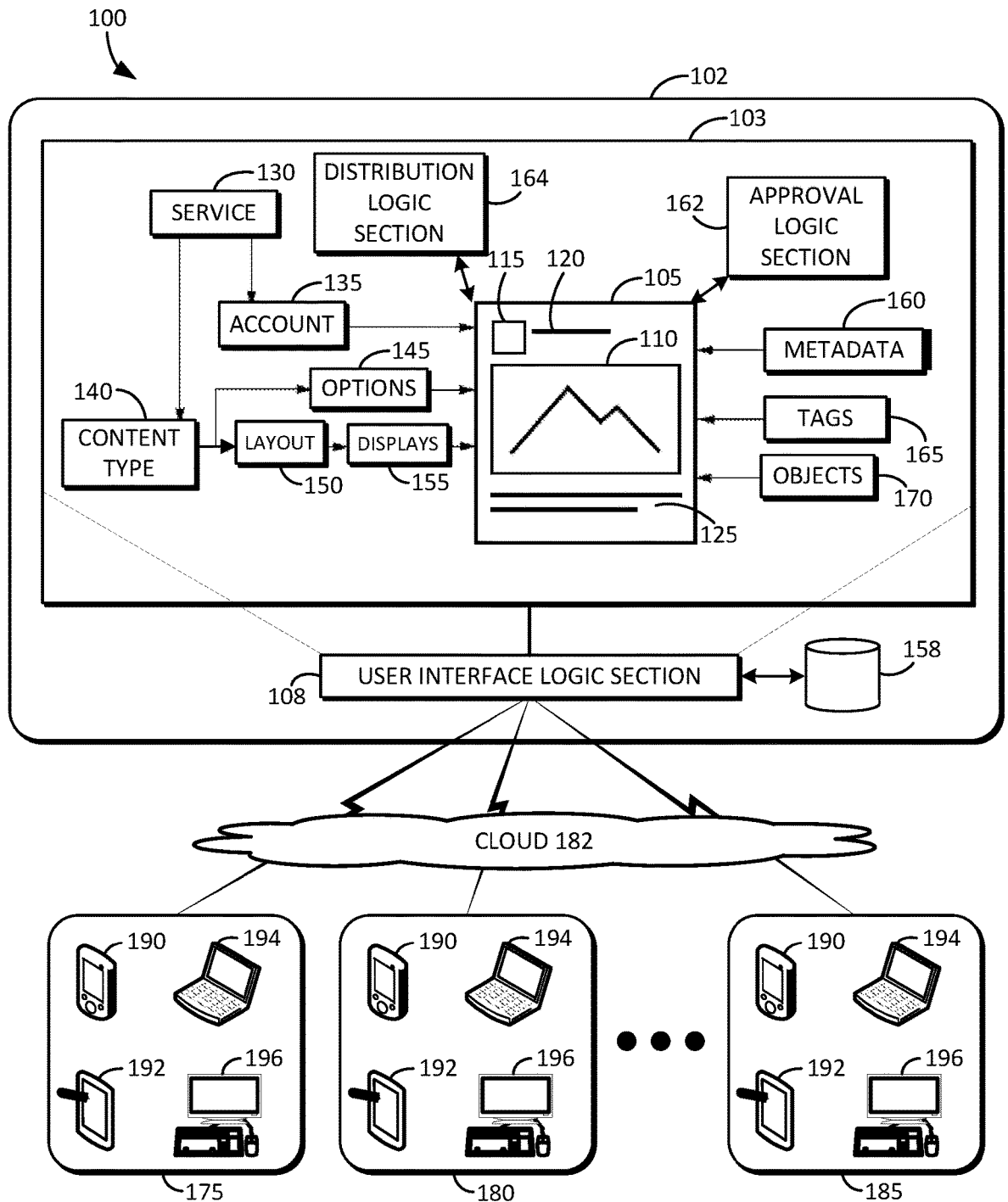
FIG. 1 illustrates a block diagram of an example multi-platform omni-channel content creation and distribution system for creating and distributing multi-platform omni-channel content in accordance with various embodiments of the present inventive concept.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first media platform could be termed a second media platform, and, similarly, a second media platform could be termed a first media platform, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the inventive concept include a multi-platform omni-channel media content creator, which can accurately plan and produce media content across a variety of channels, platforms, and/or devices. For example, digital media content can be created and be associated with various platforms (e.g., Facebook®, Twitter®, LinkedIn®, Google+®, Vine®, Snapchat®, Pinterest®, etc.) within a particular channel (e.g., social). When planning for another channel (e.g., web), embodiments of the inventive concept can input certain different or additional information to yield a webpage. By way of another example, for a channel such as retail, a template can be sent to a decal printer.

The multi-platform media content creator can include a seamless in-line editor for producing marketing media content. The techniques and systems disclosed herein allow a user to see exactly how a particular piece of media content and/or post will look throughout the process of adding content. In other words, the user can see a true-to-life simulated preview of content as it would appear on a variety of mobile and desktop displays, and for a variety of different media platforms among various channels.

Embodiments of the inventive concept can include a collaborator section in which content creators can instantly chat, for example, within the context of a particular piece of content. In accordance with the embodiments of the inventive concept disclosed herein, systems and methods disclosed herein allow businesses to create and plan marketing content, provide a collaborative environment in which team members can easily communicate with each other regarding content creation, provide true-to-life simulated previews of planned content as it actually will appear when published, obtain necessary approvals, and distribute the content to various media platforms. In addition, asset licensing usage rights for particular images or video clips can be enforced based on geography or time, as further described below.

FIG. 1 illustrates a block diagram of an example multi-platform omni-channel content creation and distribution system 100 for creating and distributing multi-platform omni-channel content in accordance with various embodiments of the present inventive concept. The omni-channel content creation and distribution system 100 can include a multi-platform omni-channel media content creator 102. The multi-platform omni-channel media content creator 102 can include a multi-platform media content data and logic structure 103. The multi-platform media content data and logic structure 103 can include a service logic section 130. For example, the service logic section 130 can provide services for a media platform and/or channel, website logic for a web platform and/or channel, or store logic for a retail store. The service logic section 130 can be communicatively coupled to an account logic section 135 and a content type logic section 140. The account logic section 135 can receive, via an account region 115 of a piece of content 105, an input for selection of a particular account of a particular media platform. The account logic section 135 can cause the selected account to be displayed in the account region 115. The account logic section 135 can provide account logic according to the platform. For example, a web page for a web-related platform can include different account logic than for an in-store retail location. A description 120 of the account can be displayed adjacent to the account region 115 on the piece of content 105.

The content type logic section 140 can be communicatively coupled to an options logic section 145. The options logic section 145 can receive a selection of options from a user, and can cause the selection of options to be displayed on the piece of content 105, or later distributed with media content 110. The content type logic section 140 can be communicatively coupled to a layout logic section 150 and a displays logic section 155. The layout logic section 150 can receive inputs from the user as to a desired layout of media content and/or posts. The displays logic section 155 can cause the desired layout to be displayed on the piece of content 105 in a simulated true-to-life form as it will appear when later published, posted, distributed and/or uploaded to one or more media platforms associated with one or more channels, such as a media platform 175, media platform 180, and/or media platform 185. The simulated true-to-life preview can have the exact dimensions for a particular media platform and device combination. For example, a simulated true-to-life preview of a Facebook® post can include the exact dimensions and layout as would appear when actually uploaded to Facebook®. By way of another example, the simulated true-to-life preview can include a desktop view or a mobile view, which allows the user to preview with exact proportional dimensions how the piece of content and/or post will appear under actual non-simulated real-world circumstances. In other words, the multi-platform media content data and logic structure 103 can cause the simulated true-to-life preview section 220 to show a piece of content (e.g., 105) with exact proportional dimensions and appearance as it would appear under actual non-simulated real-world circumstances for a particular media platform (e.g., 175, 180, and/or 185) and associated physical device (e.g., 190, 192, 194, and/or 196).

The various media platforms (e.g., 175, 180, and/or 185) can be accessed by different kinds of physical devices such as a smart phone 190, a tablet 192, a laptop computer 194, a desktop computer 196, or the like. The multi-platform omni-channel content creation and distribution system 100 can allow a user to preview the piece of content 105 in simulated true-to-life form for any combination of platforms or channels (e.g., 175, 180, and/or 185) and/or physical device (e.g., 190, 192, 194, and/or 196). The channels can include user configured channels, as described in further detail below.

The multi-platform media content data and logic structure 103 can include metadata 160, tags 165, and/or objects 170. The term "tags" includes labels or other identifying or keyword-based descriptive information of the content. The metadata 160 can describe, for example, aspects or details of the piece of content 105 including the stored location of the media content 110, a textual description 125 that can accompany the media content 110, the selected account, or the like. The tags 165 can include keywords that are relevant to the media content 110 and/or the textual description 125 of the piece of content 105. The objects 170 can include the media content 110 itself and/or other objects associated with the piece of content 105.

The multi-platform omni-channel content creator 102 can provide the created piece of content 105 for authorization by a suitable manager or creative control authority, after which the piece of content 105 can be published, posted, distributed, and/or uploaded via the cloud 182 to one or more of the media platforms (e.g., 175, 180, and 185) associated with one or more channels.

The multi-platform omni-channel media content creator 102 can include a user interface logic section 108. The user interface logic section 108 can receive inputs from one or more users associated with the media platforms (e.g., 175, 180, and 185) associated with one or more channels. The user interface logic section 108 can provide such inputs to one or more of the components of the multi-platform media content data and logic structure 103. For example, the user interface logic section 108 can interface with the service logic section 130, the account logic section 135, the content type logic section 140, the layout logic section 150, the displays logic section 155, the options logic section 145, the piece of content 105, the metadata 160, the tags 165, and/or the objects 170.

Moreover, the user interface logic section 108 can transmit information from one or more of the components of the multi-platform omni-channel content creator 102 to the media platforms (e.g., 175, 180, and 185) associated with one or more channels. In addition, the user interface logic section 108 can transmit information from one or more of the components of the multi-platform omni-channel content creator 102 to one or more physical user devices such as the smart phone 190, the tablet 192, the laptop computer 194, the desktop computer 196, or the like.

The multi-platform media content data and logic structure 103 can include an approval logic section 162. The approval logic section 162 can facilitate obtaining approvals of the piece of content 105 from a duly authorized manager or content approver. The approval logic section 162 can complete the approval seamlessly within the application. For example, the approval logic section 162 can cause the piece of content to be transferred to the content approver, and can register and display approval status. Once approved, the distribution logic section 164 can distribute the approved piece of content 105 to the particular media platform for publishing under actual non-simulated real-world circumstances.

The multi-platform omni-channel media content creator 102 can include a storage device 158 that is communicatively coupled to the user interface logic section 108. The storage device 158 can include any suitable volatile or non-volatile storage medium such as random access memory (RAM), flash memory, magnetic storage media, or the like. The storage device 158 can store the metadata 160, tags 165, and/or objects 170. The storage device 158 can store user selections received via the user interface logic section 108. The storage device 158 can store information from the service logic section 130, the account logic section 135, the options logic section 145, content type logic section 140, the layout logic section 150, and/or the displays logic section 155.

FIGS. 2 through 7 illustrate various embodiments of certain aspects of the multi-platform omni-channel media content creator 102 as shown on a display 200 in accordance with various embodiments of the present inventive concept. The display 200 can be a display of a user's computer on which the media content and/or digital media posts are being generated or planned. The display 200 can be, for example, a display of a desktop computer or workstation.

Figure 2:
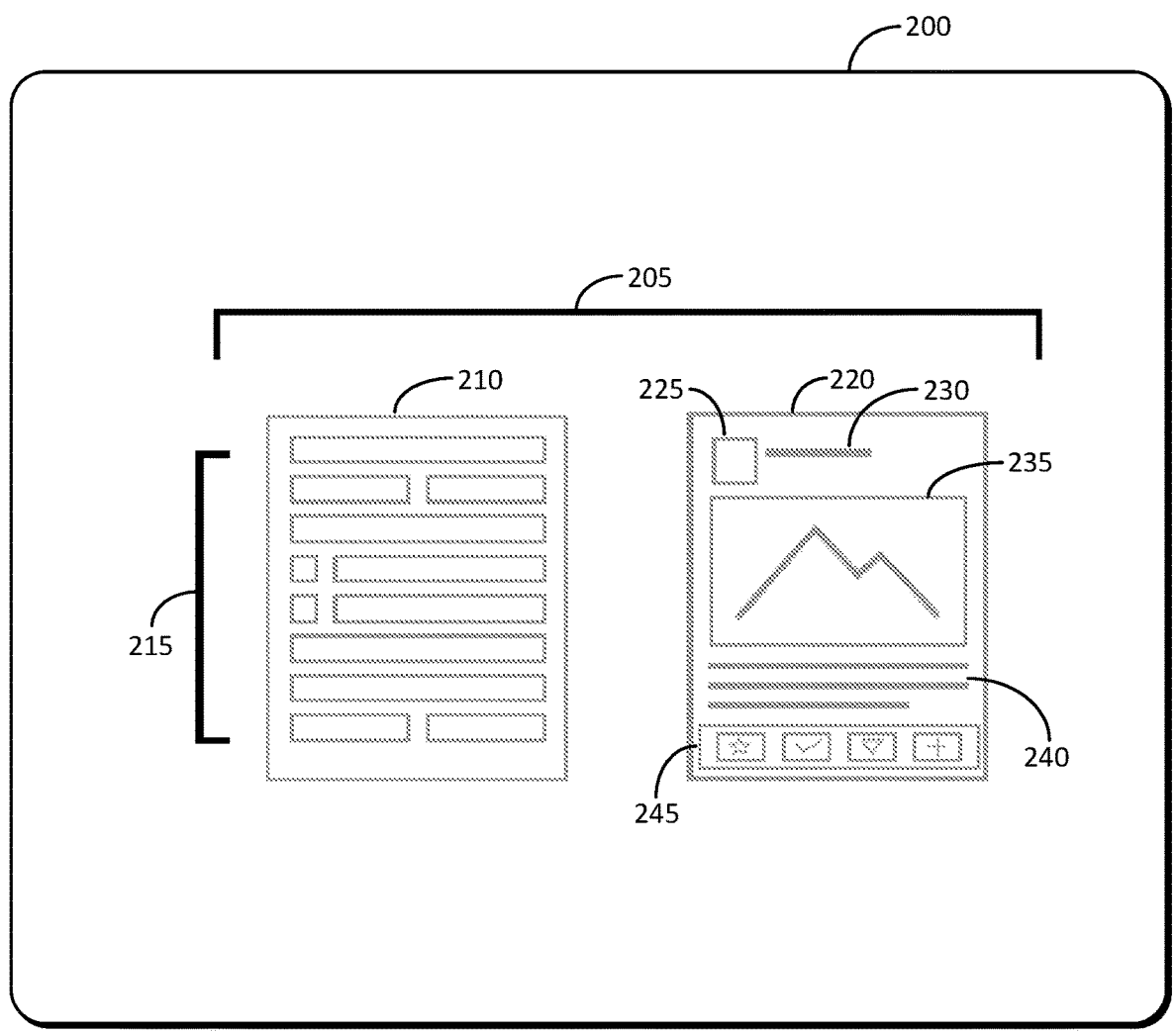
FIGS. 2 through 7 illustrate various embodiments of a multi-platform omni-channel media content creator in accordance with various embodiments of the present inventive concept.

As shown in FIG. 2, the multi-platform omni-channel content creator 102 (of FIG. 1) can provide a single view 205 in which a metadata section 210 and a simulated true-to-life preview section 220 are simultaneously displayed on the display 200. For example, the single view 205 can be a multi-sectional view including the metadata section 210 in a first section thereof and the simulated true-to-life preview section 220 in a second section thereof. The simulated true-to-life preview section 220 can be disposed adjacent to the metadata section 210. The user can add, edit, and/or delete metadata information 215 within the metadata section 210. The user interface logic section 108 (of FIG. 1) can receive the changes to the metadata information 215, and cause the changes to be reflected in the simulated true-to-life preview section 220. The user can add, edit, preview, switch view, and/or delete actual media content inline within the simulated true-to-life preview section 220. In other words, the user can "work within" the simulated true-to-life preview section 220 by dragging and dropping image content, video content, or the like into the preview section 220. The user interface logic section 108 (of FIG. 1) can detect such dragging and dropping of image content, video content, or the like, and can cause the simulated true-to-life preview section 220 to incorporate such content in real-time.

For example, the user can drag and drop an image 235 into the preview section 220. Moreover, the user can resize, move, re-arrange, and so forth, the media content within the preview section 220 using a computer mouse, touch screen gestures, or the like. In addition, the user can directly type text (e.g., 240) into the preview section 220. By way of other examples, the user can select an account 225 for a particular media platform. For example, a company may have multiple Facebook® accounts for different geographic regions of the world, and can select which account to work on. A description 230 of the account 225 can be displayed adjacent to the account 225. The preview section 220 can include native icons or buttons (e.g., 245), which can be native, or specifically tailored, to a particular media platform that is associated with the selected channel 225. The user interface logic section 108 (of FIG. 1) can facilitate these interactions by receiving or otherwise detecting the inputs and other information from the user and causing the information to be reflected in the simulated true-to-life preview section 220.

The multi-platform omni-channel content creator 102 (of FIG. 1) can cause the inline media content to be displayed in simulated true-to-life fashion during and/or after the creation and editing process. In other words, at every point along the creative pathway, the user can visualize precisely how the media content will be displayed on a particular media platform, and on a particular kind of physical device.

Figure 3:
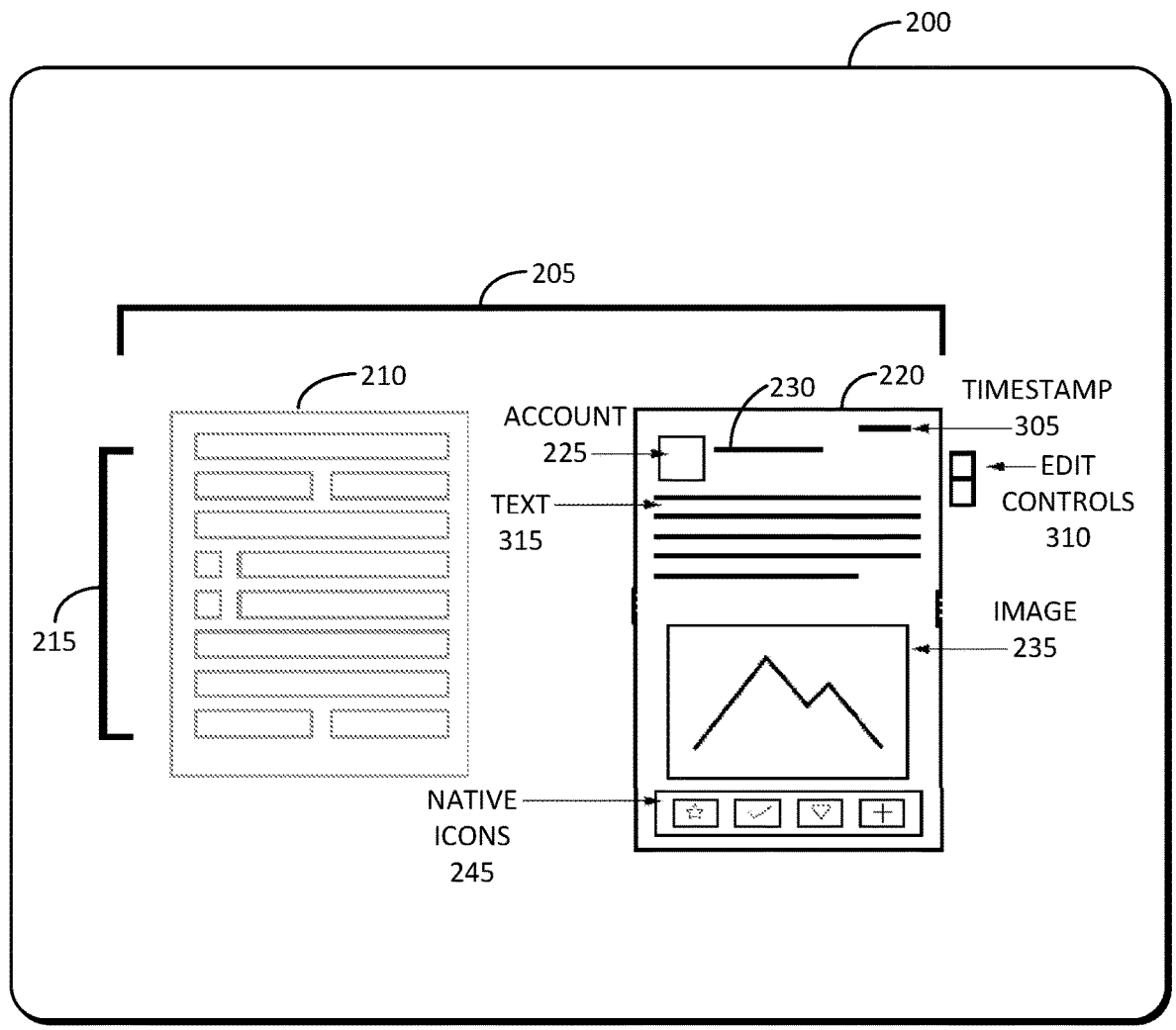

FIG. 3 includes the single view 205 including the metadata section 210 and the simulated true-to-life preview section 220, which can be provided by the multi-platform omni-channel content creator 102 (of FIG. 1). Some of the reference numerals and corresponding elements of FIG. 3 are described above, and therefore, a detailed description of such elements is not necessarily repeated. In addition, edit controls 310 can be displayed adjacent to the simulated true-to-life preview section 220. The edit controls 310 can be used to edit the media content within the preview section 220. The preview section 220 can also include a timestamp 305. For example, the timestamp 305 can indicate the last time an edit occurred. The preview section 220 can include text 315 that is disposed above the image 235. The text 315, for example, can be any suitable information, such as a branding campaign, an advertising campaign, a description of the image 235, or the like.

In some embodiments, the user interface logic section 108 can detect a manipulation by the user of the image 235 within the simulated true-to-life preview section 220. The multi-platform media content data and logic structure 102 can cause the simulated true-to-life preview section 220 to show the manipulated image 235 within the piece of content with exact proportional dimensions and appearance as it would appear under actual non-simulated real-world circumstances for the particular media platform (e.g., 175, 180, and 185) and the associated physical device (e.g., 190, 192, 194, and 196).

Figure 4:
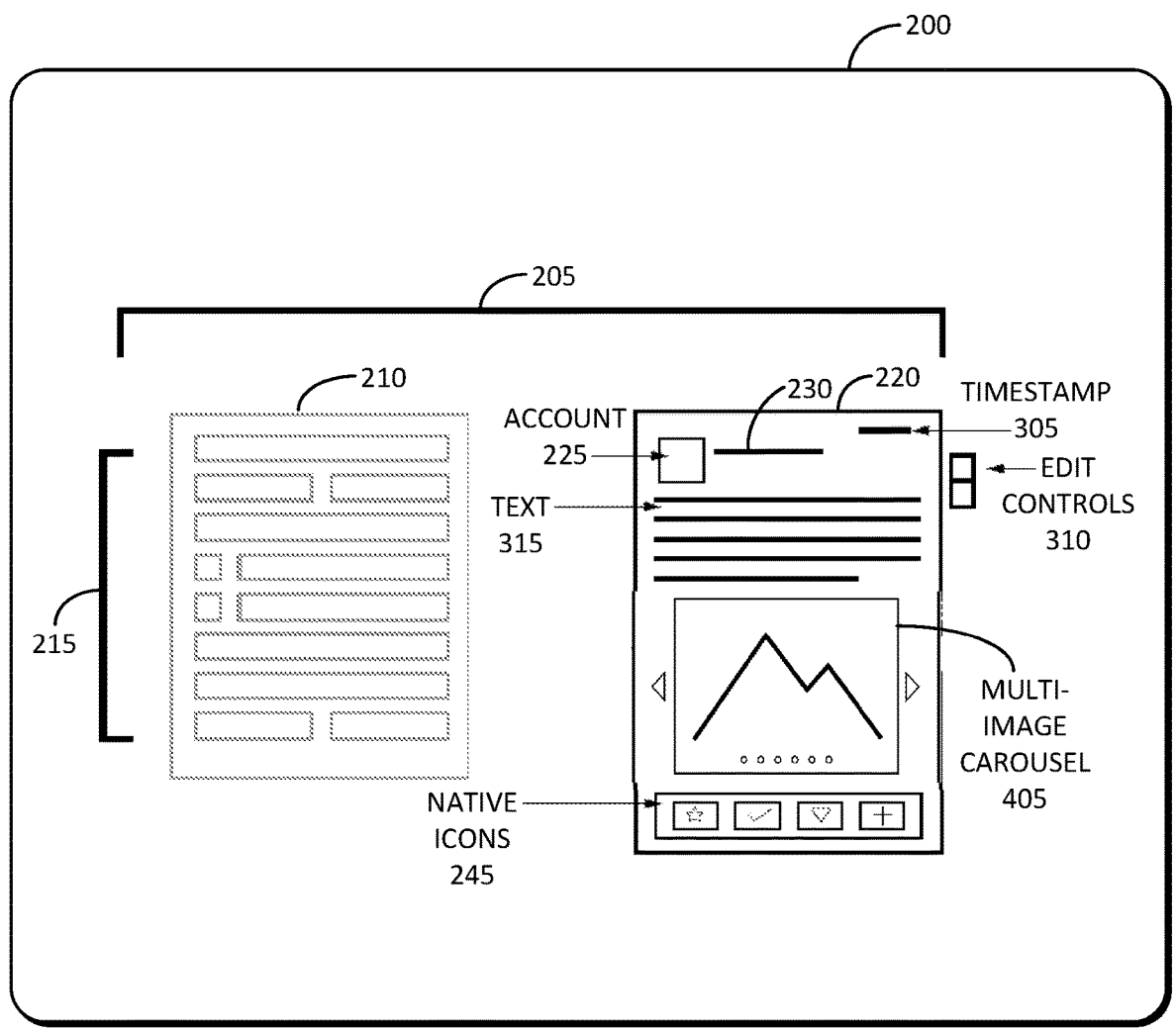

FIG. 4 is similar to FIG. 3 but also includes a multi-image carousel 405. Some of the reference numerals and corresponding elements of FIG. 4 are described above, and therefore, a detailed description of such elements is not necessarily repeated. The multi-image carousel 405 can include, for example, multiple images or pictures which can be scrolled using arrow side-to-side buttons, or other suitable controls to skip directly to a particular image within the carousel 405.

As shown in FIG. 4, the multi-platform omni-channel content creator 102 (of FIG. 1) can provide a single view 205 in which a metadata section 210 and a simulated true-to-life preview section 220 are simultaneously displayed on the display 200. The user can add, edit, and/or delete metadata information 215 within the metadata section 210. The user interface logic section 108 (of FIG. 1) can receive the changes to the metadata information 215, and cause the changes to be reflected in the simulated true-to-life preview section 220. The user can add, edit, preview, switch view, and/or delete actual media content inline within the simulated true-to-life preview section 220. In other words, the user can "work within" the simulated true-to-life preview section 220 by dragging and dropping image content, video content, or the like into the preview section 220. The user interface logic section 108 (of FIG. 1) can detect such dragging and dropping of image content, video content, or the like, and can cause the simulated true-to-life preview section 220 to incorporate such content in real-time.

For example, the user can drag and drop a multi-image carousel 405 into the preview section 220. Alternatively or in addition, the user can drag and drop one or more images onto the multi-image carousel 405 to expand or enhance the multi-image carousel 405. Moreover, the user can resize, move, re-arrange, and so forth, the media content within the preview section 220 using a computer mouse, touch screen gestures, or the like. In addition, the user can directly type text 315 into the preview section 220. By way of other examples, the user can select an account 225 for a particular media platform. A description 230 of the account 225 can be displayed adjacent to the account 225. The preview section 220 can include native icons or buttons (e.g., 245), which can be native, or specifically tailored, to a particular media platform that is associated with the selected channel 225. The user interface logic section 108 (of FIG. 1) can facilitate these interactions by receiving the inputs and other information from the user and causing the information to be reflected in the simulated true-to-life preview section 220.

The multi-platform omni-channel content creator 102 (of FIG. 1) can cause the inline media content to be displayed in simulated true-to-life fashion during and/or after the creation and editing process. In other words, at every point along the creative pathway, the user can visualize precisely how the media content, such as the multi-image carousel 405, will be displayed on a particular media platform, and on a particular kind of physical device.

Figure 5:
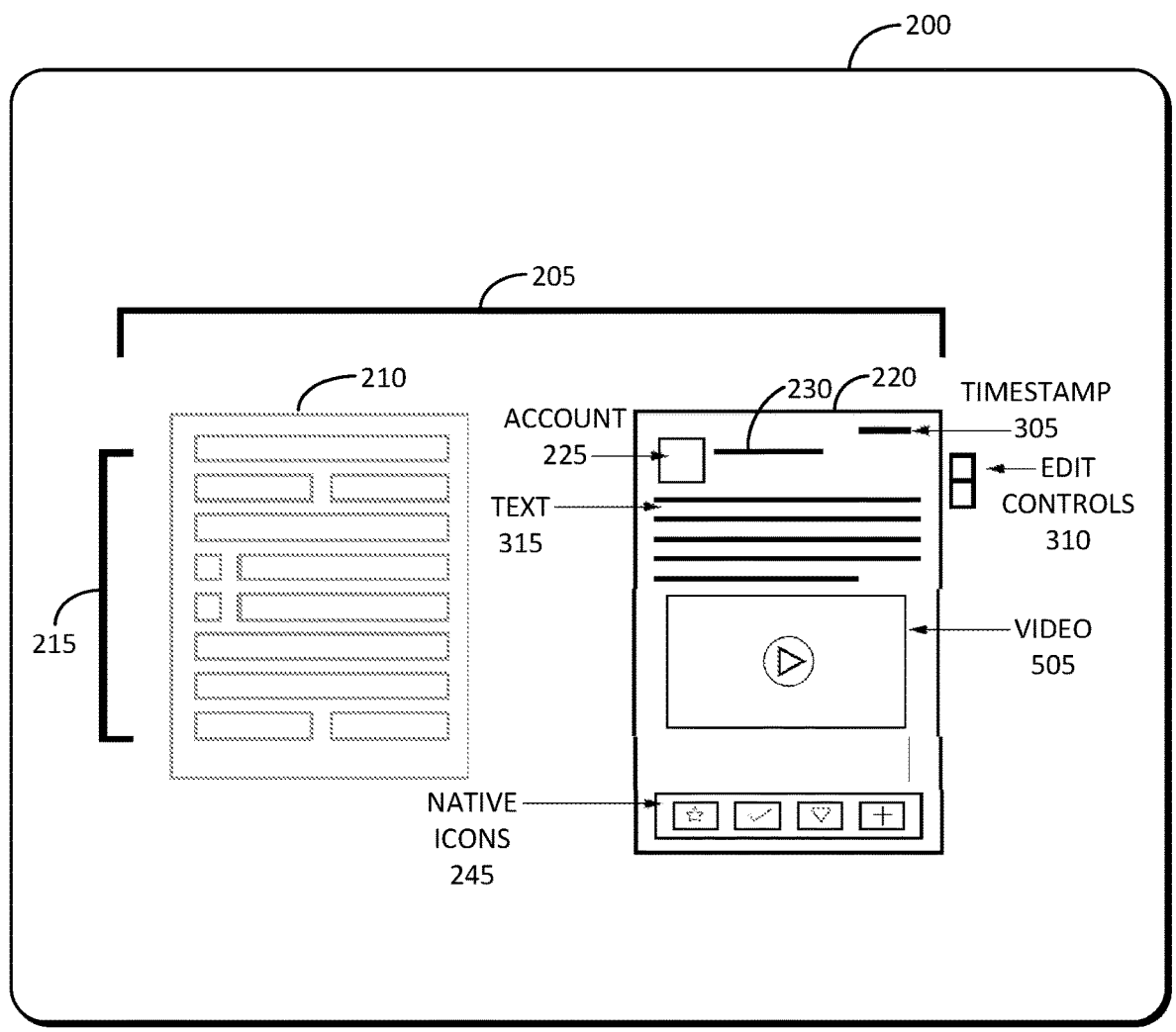

FIG. 5 is similar to FIG. 3 but also includes a video 505. The video clip 505 can be previewed within the simulated true-to-life preview section 220. Some of the reference numerals and corresponding elements of FIG. 5 are described above, and therefore, a detailed description of such elements is not necessarily repeated.

As shown in FIG. 5, the multi-platform omni-channel content creator 102 (of FIG. 1) can provide a single view 205 in which a metadata section 210 and a simulated true-to-life preview section 220 are simultaneously displayed on the display 200. The user can add, edit, and/or delete metadata information 215 within the metadata section 210. The user interface logic section 108 (of FIG. 1) can receive the changes to the metadata information 215, and cause the changes to be reflected in the simulated true-to-life preview section 220. The user can add, edit, preview, switch view, and/or delete actual media content inline within the simulated true-to-life preview section 220. In other words, the user can "work within" the simulated true-to-life preview section 220 by dragging and dropping image content, video content, or the like into the preview section 220. The user interface logic section 108 (of FIG. 1) can detect such dragging and dropping of image content, video content, or the like, and can cause the simulated true-to-life preview section 220 to incorporate such content in real-time.

For example, the user can drag and drop a video clip 505 into the preview section 220. Moreover, the user can resize, move, re-arrange, and so forth, the media content such as the video clip 505 within the preview section 220 using a computer mouse, touch screen gestures, or the like. In addition, the user can directly type text 315 into the preview section 220. By way of other examples, the user can select an account 225 for a particular media platform. A description 230 of the account 225 can be displayed adjacent to the account 225. The preview section 220 can include native icons or buttons (e.g., 245), which can be native, or specifically tailored, to a particular media platform that is associated with the selected channel 225. The user interface logic section 108 (of FIG. 1) can facilitate these interactions by receiving the inputs and other information from the user and causing the information to be reflected in the simulated true-to-life preview section 220.

The multi-platform omni-channel content creator 102 (of FIG. 1) can cause the inline media content to be displayed in simulated true-to-life fashion during and/or after the creation and editing process. In other words, at every point along the creative pathway, the user can visualize precisely how the media content, such as the video clip 505, will be displayed on a particular media platform, and on a particular kind of physical device.

Figure 6:
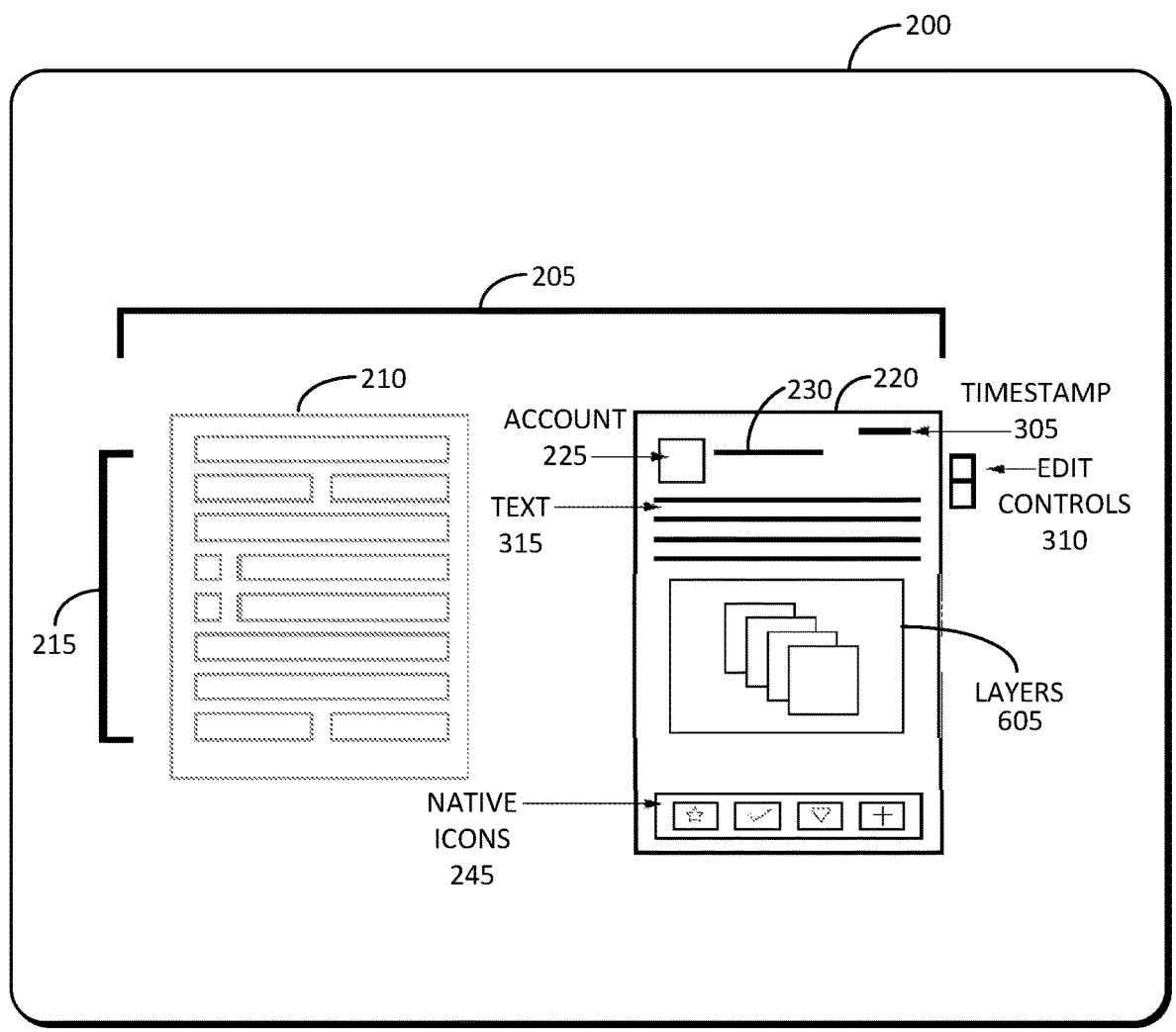

FIG. 6 is similar to FIG. 3 but can also include layers 605. Some of the reference numerals and corresponding elements of FIG. 6 are described above, and therefore, a detailed description of such elements is not necessarily repeated. The layers 605 can be previewed within the simulated true-to-life preview section 220. The layers 605 can allow the user to cause multiple objects to be layered one on top of another within the simulated true-to-life preview section 220.

A layer builder, such as that shown in FIG. 29 and described below, can replace a template altogether and instead give the user the ability to build image parameters for any desired output (e.g., email banners or website text blocks, etc.). Once the layers 605 are built, data fields and attributes can be added. This can be associated with configurable channels and can include true-to-life simulated previews.

As shown in FIG. 6, the multi-platform omni-channel content creator 102 (of FIG. 1) can provide a single view 205 in which a metadata section 210 and a simulated true-to-life preview section 220 are simultaneously displayed on the display 200. The user can add, edit, and/or delete metadata information 215 within the metadata section 210. The user interface logic section 108 (of FIG. 1) can receive the changes to the metadata information 215, and cause the changes to be reflected in the simulated true-to-life preview section 220. The user can add, edit, preview, switch view, and/or delete actual media content inline within the simulated true-to-life preview section 220. In other words, the user can "work within" the simulated true-to-life preview section 220 by dragging and dropping image content, video content, or the like into the preview section 220. The user interface logic section 108 (of FIG. 1) can detect such dragging and dropping of layers, image content, video content, or the like, and can cause the simulated true-to-life preview section 220 to incorporate such content in real-time.

For example, the user can drag and drop one or more layers 605 into the preview section 220. Moreover, the user can resize, move, re-arrange, and so forth, the media content within the preview section 220 using a computer mouse, touch screen gestures, or the like. In addition, the user can directly type text 315 into the preview section 220. By way of other examples, the user can select an account 225 for a particular media platform. A description 230 of the account 225 can be displayed adjacent to the account 225. The preview section 220 can include native icons or buttons (e.g., 245), which can be native, or specifically tailored, to a particular media platform that is associated with the selected channel 225. The user interface logic section 108 (of FIG. 1) can facilitate these interactions by receiving the inputs and other information from the user and causing the information to be reflected in the simulated true-to-life preview section 220.

The multi-platform omni-channel content creator 102 (of FIG. 1) can cause the inline media content to be displayed in simulated true-to-life fashion during and/or after the creation and editing process. In other words, at every point along the creative pathway, the user can visualize precisely how the media content, such as the layers 605, will be displayed on a particular media platform, and on a particular kind of physical device.

Figure 7:
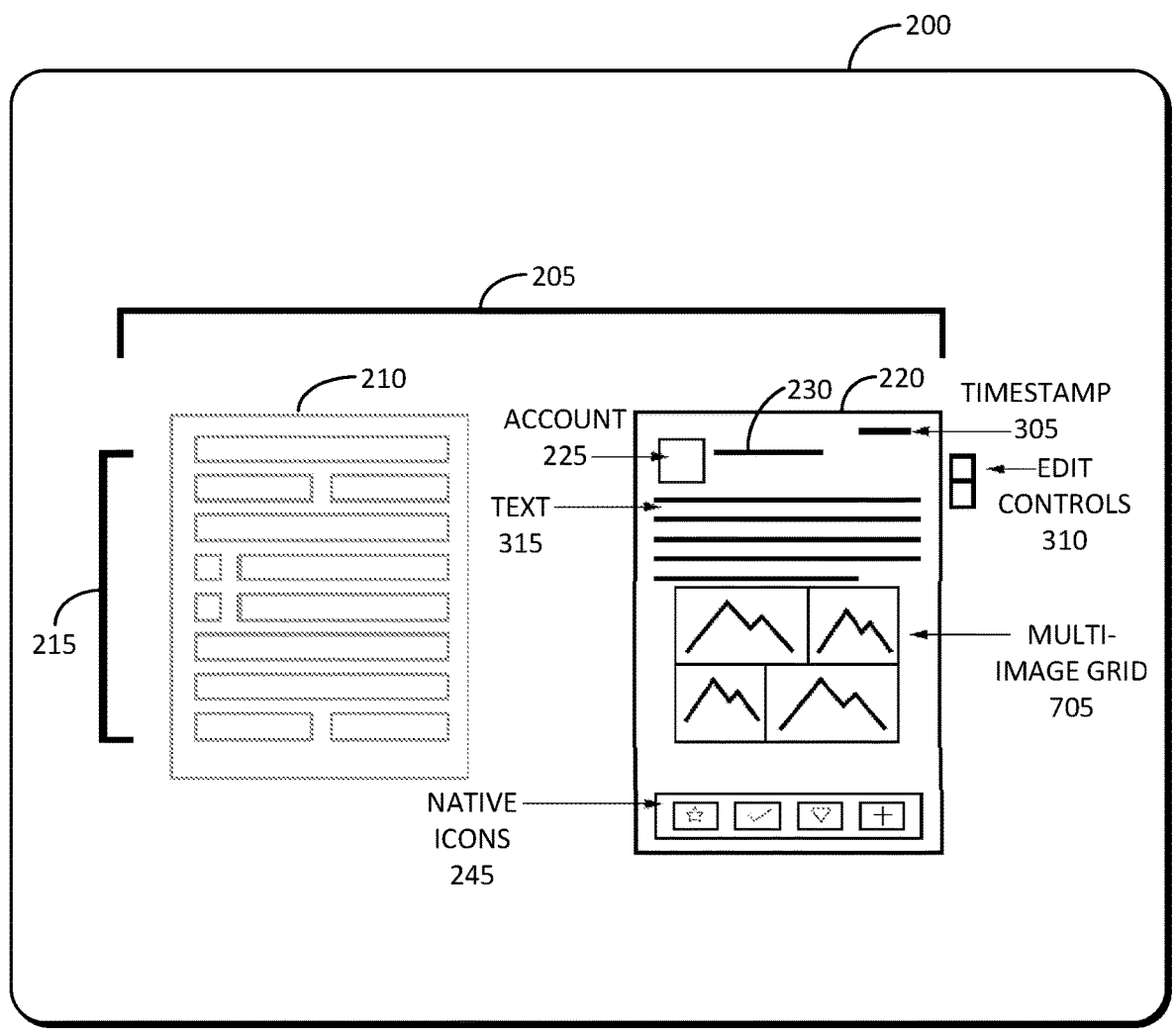

FIG. 7 is similar to FIG. 3 but also includes a multi-image grid 705. Some of the reference numerals and corresponding elements of FIG. 7 are described above, and therefore, a detailed description of such elements is not necessarily repeated. The multi-image grid 705 can be previewed within the simulated true-to-life preview section 220, and can contain multiple images within a single grid.

As shown in FIG. 7, the multi-platform omni-channel content creator 102 (of FIG. 1) can provide a single view 205 in which a metadata section 210 and a simulated true-to-life preview section 220 are simultaneously displayed on the display 200. The user can add, edit, and/or delete metadata information 215 within the metadata section 210. The user interface logic section 108 (of FIG. 1) can receive the changes to the metadata information 215, and cause the changes to be reflected in the simulated true-to-life preview section 220. The user can add, edit, preview, switch view, and/or delete actual media content inline within the simulated true-to-life preview section 220. In other words, the user can "work within" the simulated true-to-life preview section 220 by dragging and dropping image content, video content, or the like into the preview section 220. The user interface logic section 108 (of FIG. 1) can detect such dragging and dropping of layers, image content, video content, or the like, and can cause the simulated true-to-life preview section 220 to incorporate such content in real-time.

For example, the user can drag and drop one or more multi-image grids 705 into the preview section 220. Moreover, the user can resize, move, re-arrange, and so forth, the media content within the preview section 220 using a computer mouse, touch screen gestures, or the like. In addition, the user can directly type text 315 into the preview section 220. By way of other examples, the user can select an account 225 for a particular media platform. A description 230 of the account 225 can be displayed adjacent to the account 225. The preview section 220 can include native icons or buttons (e.g., 245), which can be native, or specifically tailored, to a particular media platform that is associated with the selected channel 225. The user interface logic section 108 (of FIG. 1) can facilitate these interactions by receiving the inputs and other information from the user and causing the information to be reflected in the simulated true-to-life preview section 220.

The multi-platform omni-channel content creator 102 (of FIG. 1) can cause the inline media content to be displayed in simulated true-to-life fashion during and/or after the creation and editing process. In other words, at every point along the creative pathway, the user can visualize precisely how the media content, such as the multi-image grid 705, will be displayed on a particular media platform, and on a particular kind of physical device.

Figure 8:
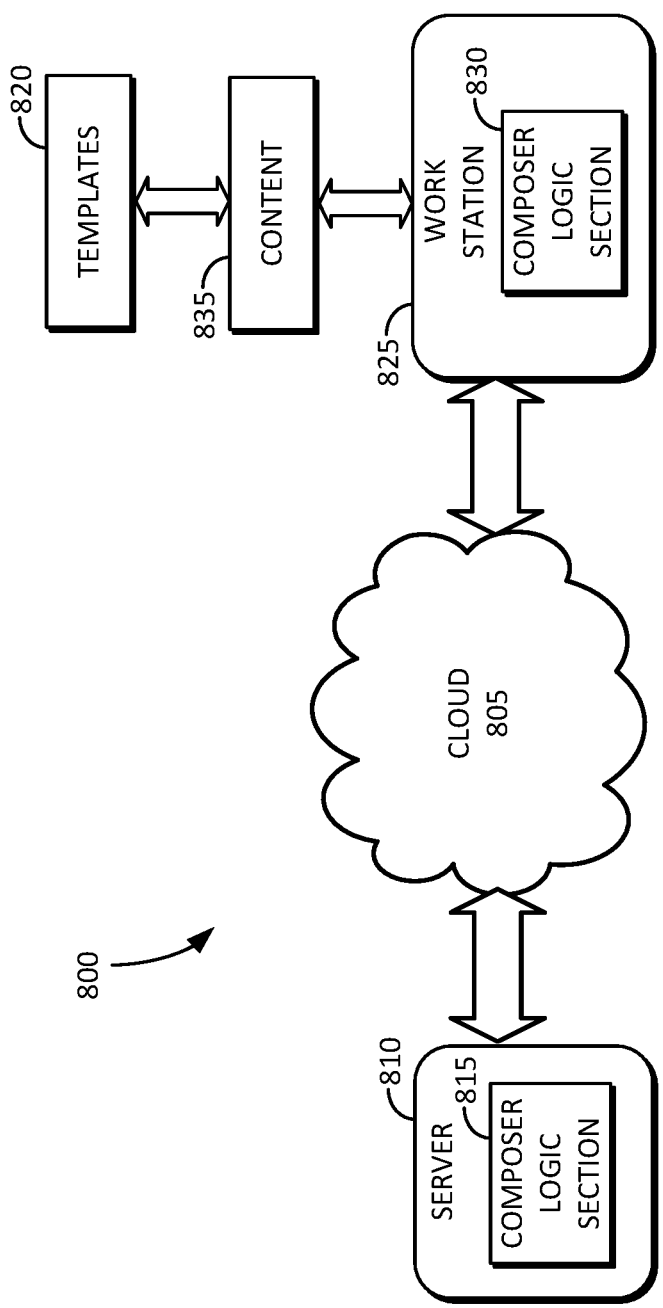
FIG. 8 illustrates a block diagram of another example multi-platform media content creation and distribution system for creating and distributing multi-platform media content in accordance with various embodiments of the present inventive concept.

FIG. 8 illustrates a block diagram of another example multi-platform omni-channel media content creation and distribution system 800 for creating and distributing multi-platform media content in accordance with various embodiments of the present inventive concept. The multi-platform omni-channel media content creation and distribution system 800 can include a computer server 810 and a work station 825. The work station 825 can function as a client to the server 810. The computer server 810 can include a composer logic section 815. The composer logic section 815 can include, for example, the multi-platform omni-channel content creator 102 (of FIG. 1). The work station 825 may include a composer logic section 830, which may include the multi-platform omni-channel content creator 102. The work station 825 and/or the computer server 810 can access templates 820. The templates 820 can include layout configurations for the piece of content (e.g., 105 of FIG. 1) for each media platform and/or each physical device.

The templates 820 can include templates for all major marketing and social platforms. For example, the templates 820 can include a Facebook® template, a Twitter® template, a Linkedin® template, an Instagram® template, a Google+® template, or the like. Alternatively or in addition, the templates 820 can include templates for web layouts (e.g., WordPress®), or the like. Alternatively or in addition, the templates 820 can include templates for print or retail layouts. The user and/or administrator can select or otherwise establish one or more predefined output parameters for any given channel, such as number of pixels, number of characters, number of colors, or the like. The channels can be configurable channels based on the predefined output parameters.

The work station 825 can receive media content 835. The media content 835 can be used to generate one or more pieces of media content and/or posts (e.g., 105 of FIG. 1) for distribution to one or more media platforms associated with one or more channels. The composer logic section 830 can receive the media content 835, which can be incorporated, for example, into the simulated true-to-life preview section 220 (of FIG. 2). Moreover, the composer logic section 830 can receive the templates 820, which can be incorporated, for example, into the simulated true-to-life preview section 220 (of FIG. 2). The templates 820 can provide the scaffolding (e.g., a default layout, default dimensions, and the like) to the media content 835.

Figure 9:
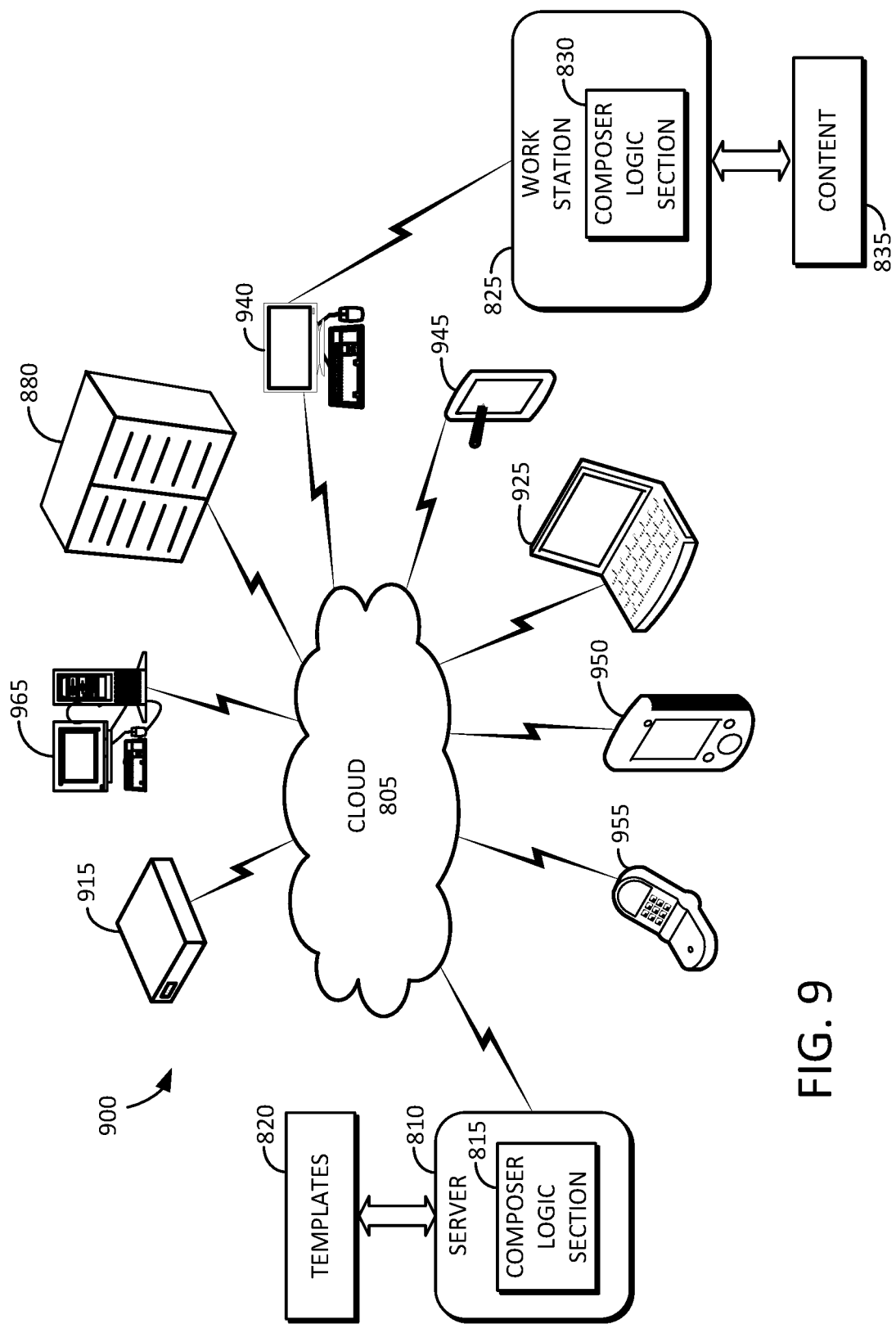
FIG. 9 illustrates a block diagram of yet another example multi-platform media content creation and distribution system for creating and distributing multi-platform media content in accordance with various embodiments of the present inventive concept.

FIG. 9 illustrates a block diagram of yet another example multi-platform omni-channel media content creation and distribution system 900 for creating and distributing multi-platform media content in accordance with various embodiments of the present inventive concept. The system 900 can include the cloud 805, the computer server 810 including the composer logic section 815, the work station 825 including the composer logic section 830, the templates 820, and the content 835. Moreover, customers or users can access the media content through the various media platforms associated with one or more channels using a phone 955, a smart phone 950, a laptop computer 925, a tablet 945, a work station 940, a personal computer 965, or the like. The templates 820 and/or the content 835 can be stored in a cloud-accessible database 880 and/or on a network device 915.

Figure 10:
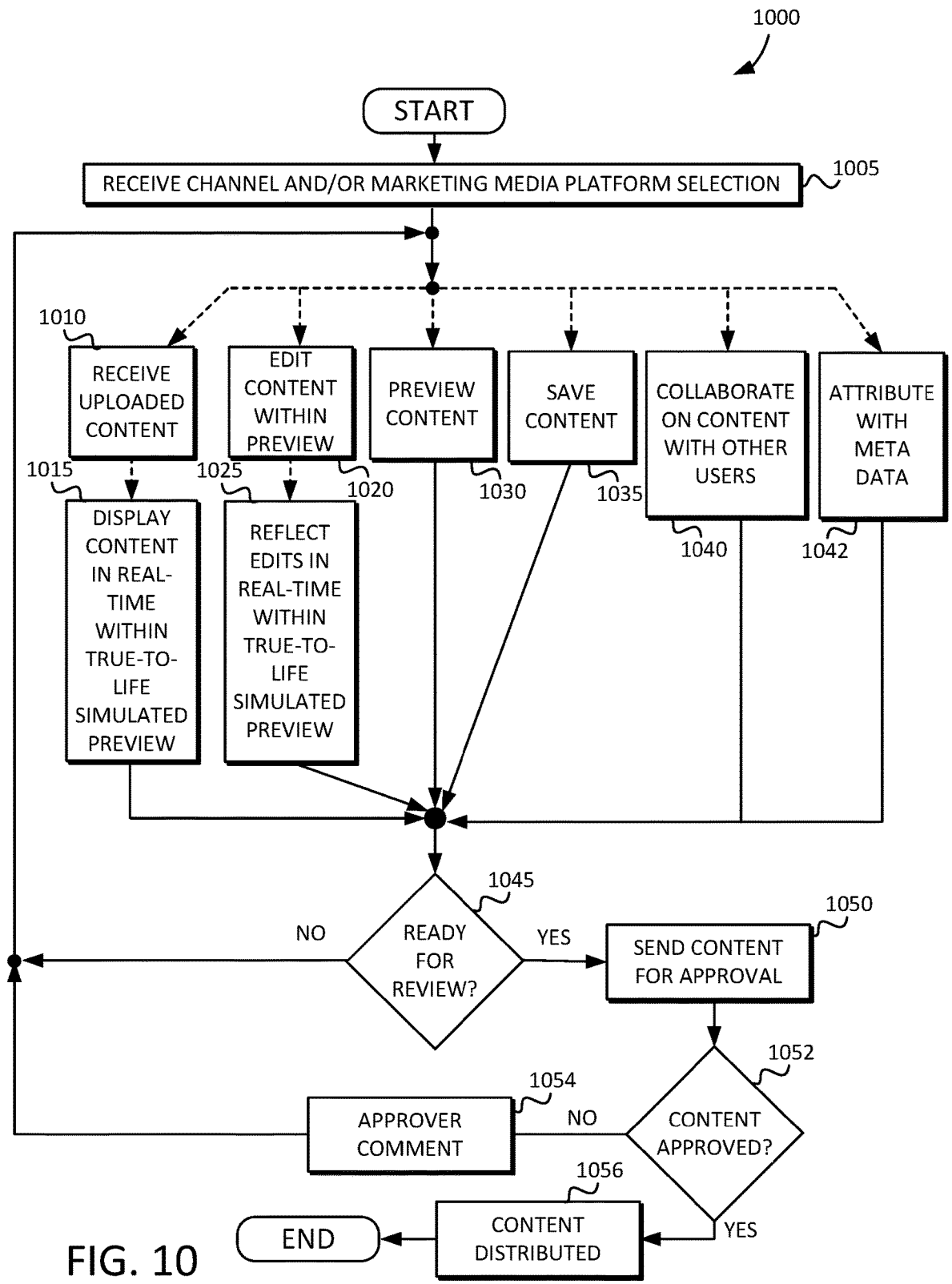
FIG. 10 illustrates a flow diagram including a technique for creating, collaborating on, approving, and distributing media content in accordance with various embodiments of the present inventive concept.

FIG. 10 illustrates a flow diagram 1000 including a technique for creating, collaborating on, approving, and distributing media content in accordance with various embodiments of the present inventive concept. The technique can begin at 1005, where a channel selection can be received by the multi-platform omni-channel content creator 102 (of FIG. 1). In other words, a user can select a particular channel from among multiple channels (e.g., social, email, web, print, retail, billboard, or the like). Alternatively or in addition, the user can select a particular media platform from among multiple media platforms (e.g., long form, mobile message, Pinterest®, press release, Facebook®, Twitter®, LinkedIn®, Google+®, Vine®, Snapchat®, Pinterest®, Tumblr®, or the like). The user interface logic section 108 (of FIG. 1) can receive and process the user selection. The user can select a particular account associated with the particular media platform. Thereafter, the flow can proceed along one of several paths. For example, the flow can proceed to 1010, where uploaded content can be received by the multi-platform omni-channel content creator 102. For example, the user interface logic section 108 (of FIG. 1) can receive and process the uploaded content. The storage device 158 (of FIG. 1) can store the uploaded content. Thereafter, the content can be displayed in real-time within a true-to-life simulated preview at 1015. Alternatively, the flow can proceed to 1020, where the content can be edited inline within the preview, after which, the edits can be reflected in real-time within the true-to-life simulated preview at 1025. For example, the user interface logic section 108 (of FIG. 1) can receive and process user edits. The layout logic section 150 and/or the displays logic section 155 can cause the edits to be reflected in the true-to-life simulated preview section 220 (of FIG. 2).

At any time during and after the creation of a piece of media content and/or a post (e.g., 105 of FIG. 1), the content can be previewed at 1030. At 1035, the content can be saved by the storage device 158 (of FIG. 1). The saved content can be accessed at any appropriate time to either display the content or transfer the content. At 1040, multiple users can collaborate about a particular piece of content, a particular post under development, or the like. The collaboration can take the form of a real-time chat within the context of the multi-platform omni-channel content creator 102. In other words, a real-time chat window can be included within the single view (e.g., 205 of FIG. 2) that includes the simulated true-to-life preview section (e.g., 220 of FIG. 2). At 1042, media content can be attributed with metadata including attributes such as one or more tags, required approvers, or the like.

At 1045, a determination can be made whether the content and/or post is ready for review. If NO, the flow can return for further processing, uploading, editing, collaborating, or the like. Otherwise, if YES, the flow can proceed to 1050 where the content can be sent or transferred, by the approval logic section 162 (of FIG. 1) to a client or workstation for approval by a manager or other person having approving authority. The approval logic section 162 (of FIG. 1) can register and/or display the approval status. Once approved at 1052, the content and/or post can be distributed, by the distribution logic section 165 of the multi-platform omni-channel media content creator 102, to the various media platforms associated with one or more channels at 1056. Otherwise, if not approved at 1052, an approver comment can be returned at 1054 to the user and/or content creator so that additional revisions can be made to the media content. After completion and approval of a particular piece of content, the process can be repeated by starting over at 1005. In other words, a different channel and/or media platform can be selected, and another different piece of content can be created within the simulated true-to-life preview section. Such process can be repeated any suitable number of times for various channels and/or media platforms all using the same tool. It will be understood that the steps need not be performed in the order shown, but rather, can be performed in a different order and/or with intervening steps.

Figure 11:
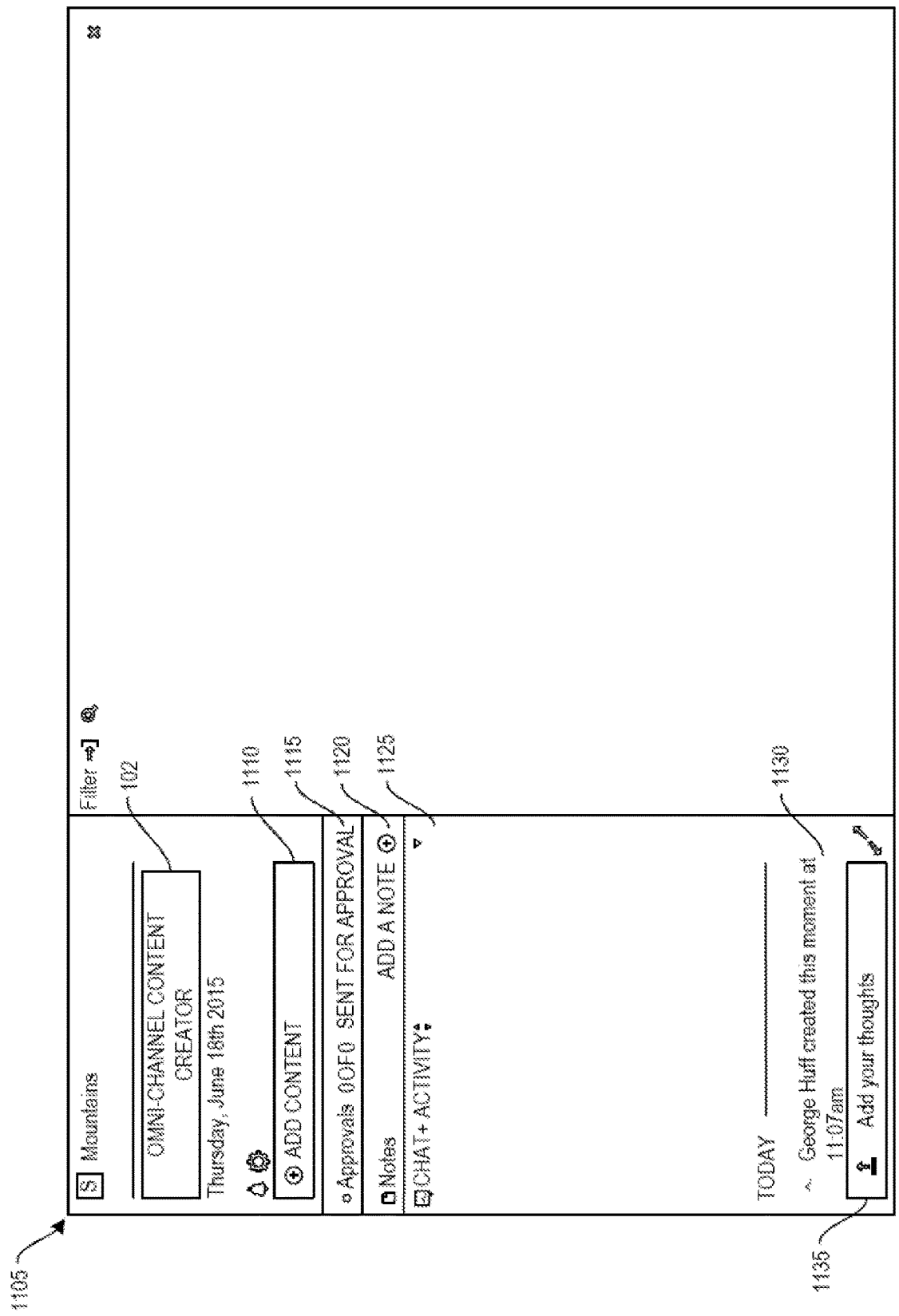

FIGS. 11 through 26 illustrate various example embodiments of the multi-platform omni-channel content creator 102 of FIG. 1 in accordance with various embodiments of the present inventive concept FIG. 11 illustrates an example embodiment of a user interface 1105 of the multi-platform omni-channel content creator 102 of FIG. 1 including an add content selection 1110 for adding media content, an approvals section 1115 for requesting approval by a manager or other person having approving authority, a note section 1120 for adding a note, and a chat+activity section 1125 for chatting and other kinds of collaboration among multiple users of the multi-platform omni-channel content creator 102. The user interface 1105 of the multi-platform omni-channel content creator 102 can also include a journal section 1130 configured to display recent actions related to a particular piece of content or moment. The multi-platform omni-channel content creator 102 can also include an "Add your thoughts" section 1135 configured to receive thoughts in the form of textual input from the user. The user interface logic section 108 (of FIG. 1) can interface with one or more users, receive information from the one or more users, cause information to be displayed on a display in accordance with the user interface 1105, and cause information to be displayed within the user interface 1105.

Figure 12:
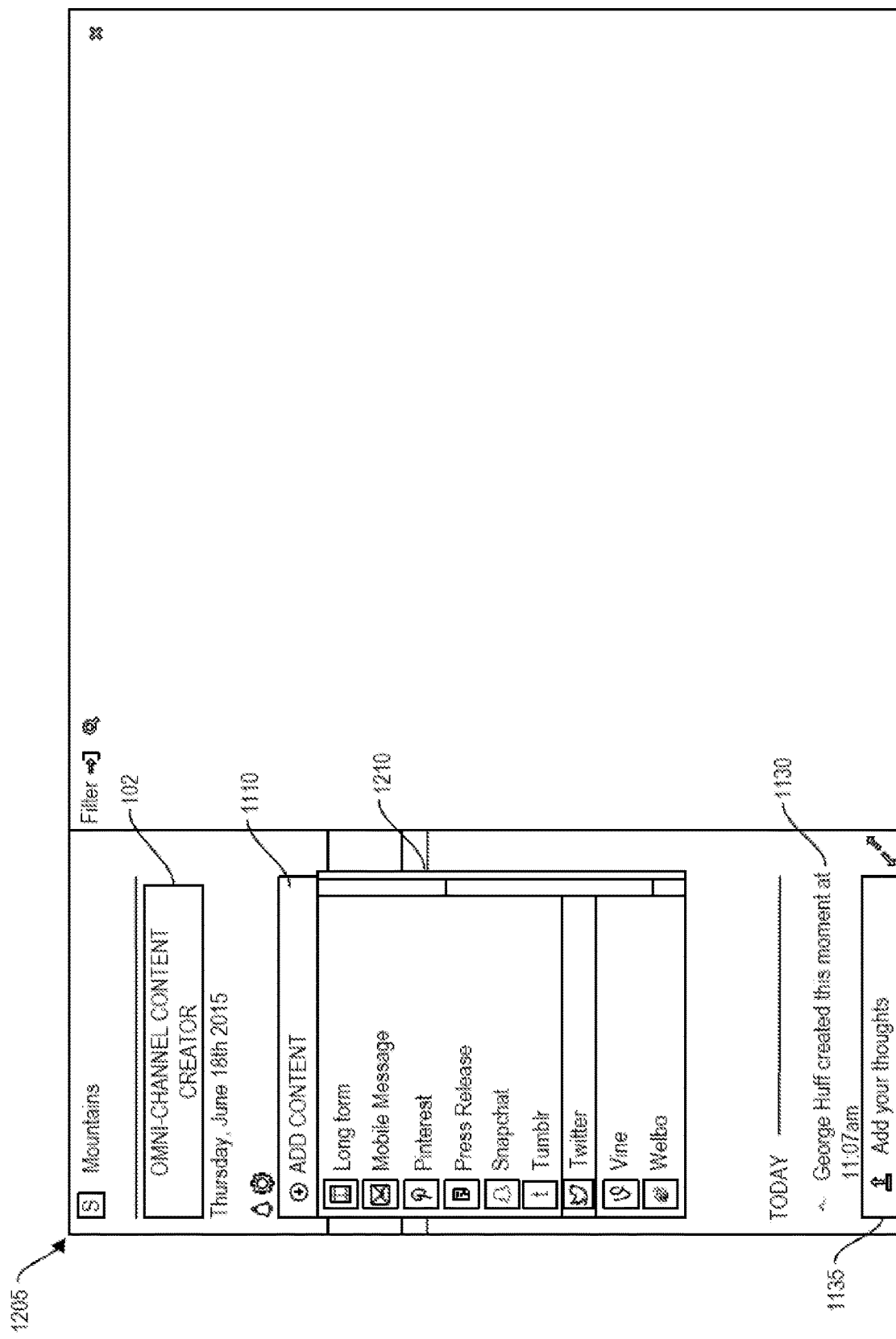

FIG. 12 illustrates an example embodiment of a user interface 1205 of the multi-platform omni-channel content creator 102 of FIG. 1 including the add content selection 1110 with a drop down menu 1210 of various media platforms and/or channels, which can include configurable channels. Some of the reference numerals and corresponding elements of FIG. 12 are described above, and therefore, a detailed description of such elements is not necessarily repeated. Configurable channels can allow the user to quickly create a content shell for any channel, then complete in parts, add tags, replicate, move, or the like. A user can select a particular media platform and/or channel from the drop down menu 1210. For example, the drop down menu 1210 can include selections for long form, mobile message, Pinterest®, press release, Snapchat®, Tumblr®, Twitter®, Vine®, or the like. The user interface logic section 108 (of FIG. 1) can interface with one or more users, receive information from the one or more users, cause information to be displayed in accordance with the add content selection 1110 and corresponding drop down menu 1210, and cause information to be displayed in the user interface 1205.

Figure 13:
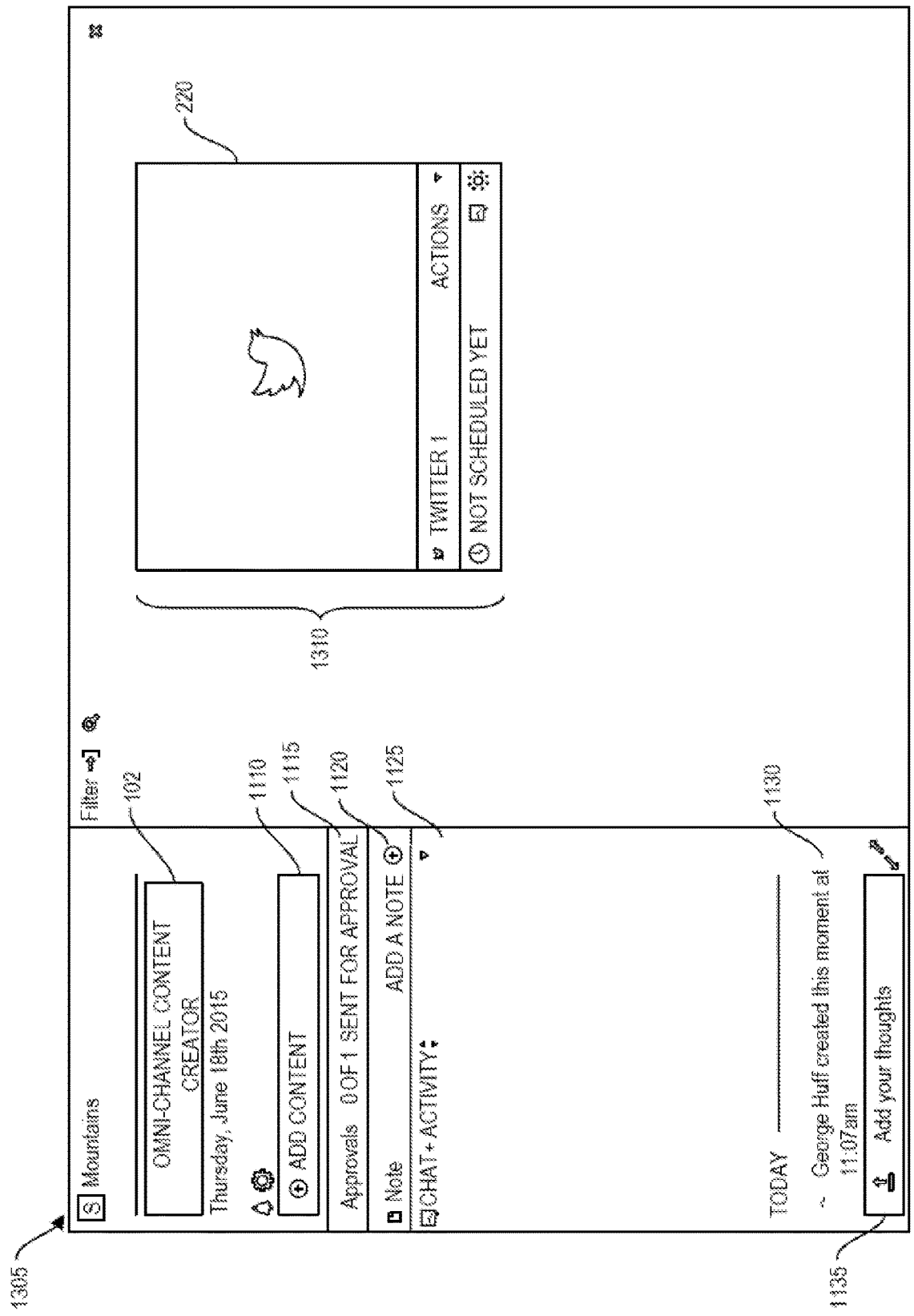

FIG. 13 illustrates an example embodiment of a user interface 1305 of the multi-platform omni-channel content creator 102 of FIG. 1 including an embodiment within the sequence of content creation, which can include a content shell 1310 within a window of the user interface 1305, which can be displayed on a display (e.g., 200 of FIG. 2). Some of the reference numerals and corresponding elements of FIG. 13 are described above, and therefore, a detailed description of such elements is not necessarily repeated. The simulated true-to-life preview section 220 (e.g., of FIG. 2) can be displayed within the content shell 1310. The user interface logic section 108 (of FIG. 1) can interface with one or more users, receive information from the one or more users, cause information to be displayed on a display in accordance with the user interface 1305, and cause information to be displayed within the user interface 1305.

Figure 14:
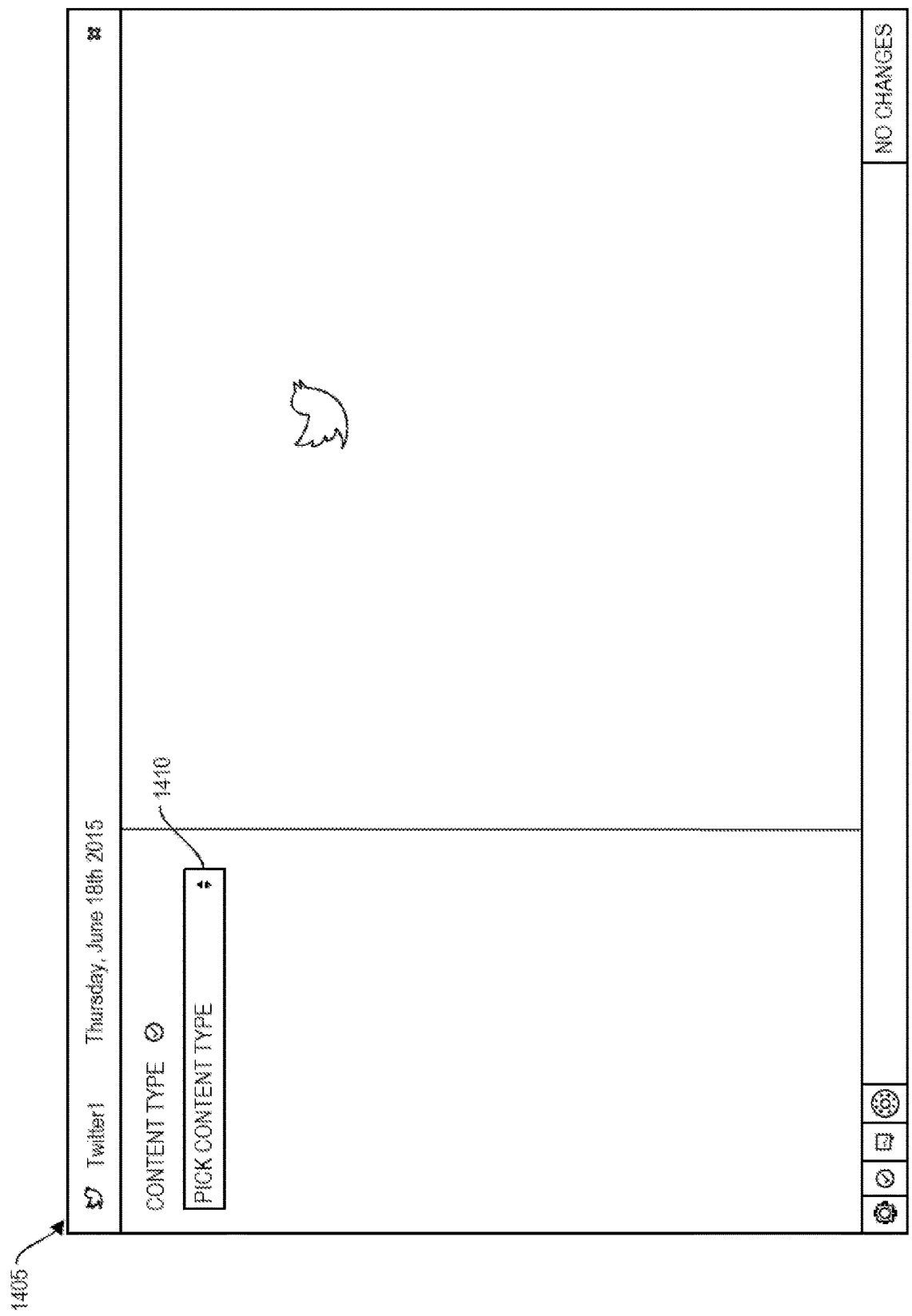

FIG. 14 illustrates an example embodiment of a user interface 1405 of the multi-platform omni-channel content creator 102 of FIG. 1 including a pick content type option 1410. The pick content type option 1410 allows the user to pick a type of content to be displayed. The content type logic section 140 (of FIG. 1) can cause the picked type of content to be displayed via the user interface 1405. The user interface logic section 108 (of FIG. 1) can interface with one or more users, receive information from the one or more users, cause information to be displayed on a display in accordance with the user interface 1405, and cause information to be displayed within the user interface 1405.

Figure 15:
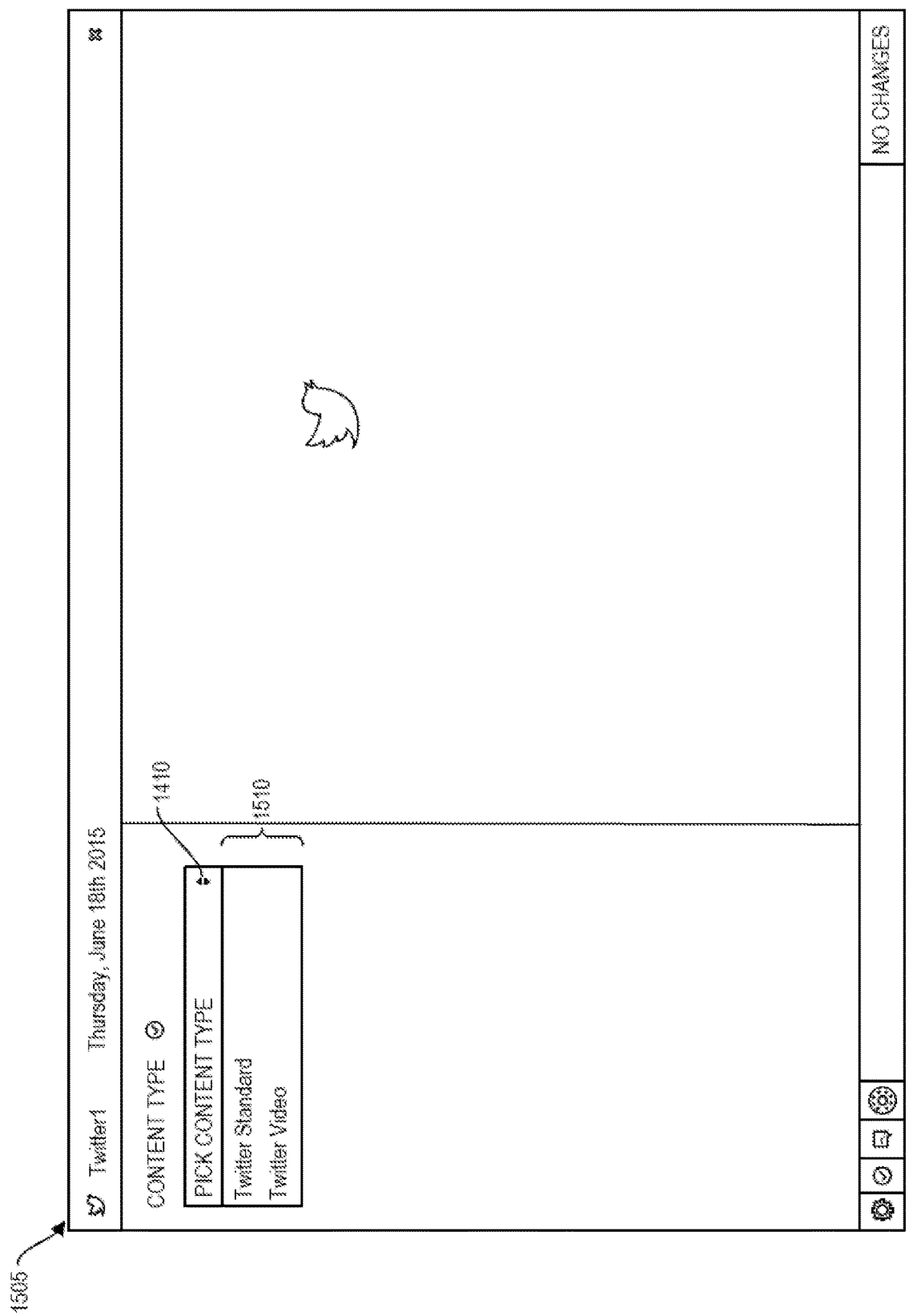

FIG. 15 illustrates an example embodiment of a user interface 1505 of the multi-platform omni-channel content creator 102 of FIG. 1 including the pick content type option 1410 with a drop down menu of various content types 1510 specific to the selected channel. For example, for a Twitter® channel, the types of content provided in the drop down menu can include Twitter® Standard or Twitter® Video. A user can select a particular content type such as standard, videos, advertising, or the like. Moreover, the user can define a new content type. The content type logic section 140 (of FIG. 1) can store, display, and otherwise interact with the user regarding the various content types 1510. The user interface logic section 108 (of FIG. 1) can interface with one or more users, receive information from the one or more users, cause information to be displayed on a display in accordance with the user interface 1505, and cause information to be displayed within the user interface 1505.

Figure 16:
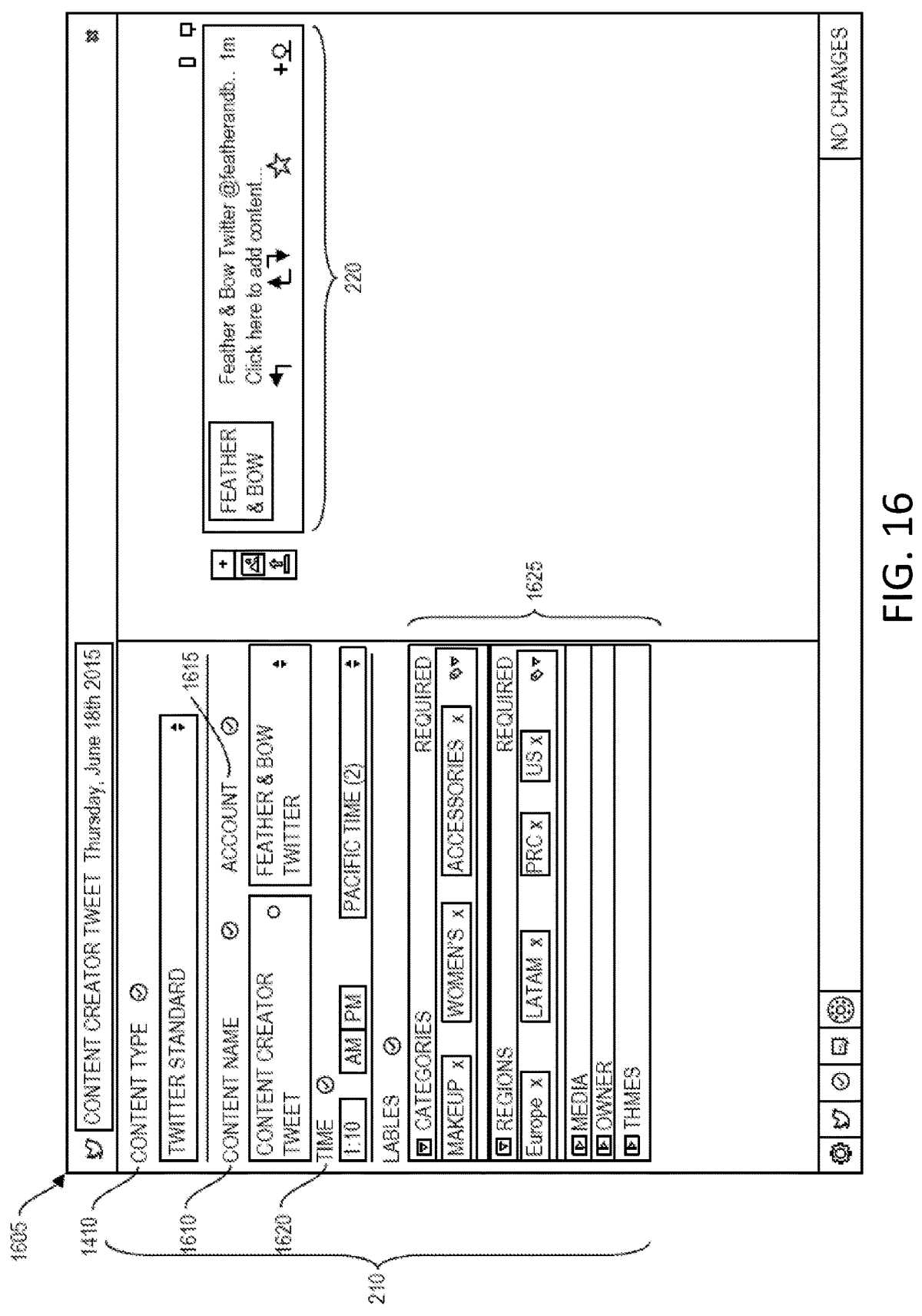
Figure 17:
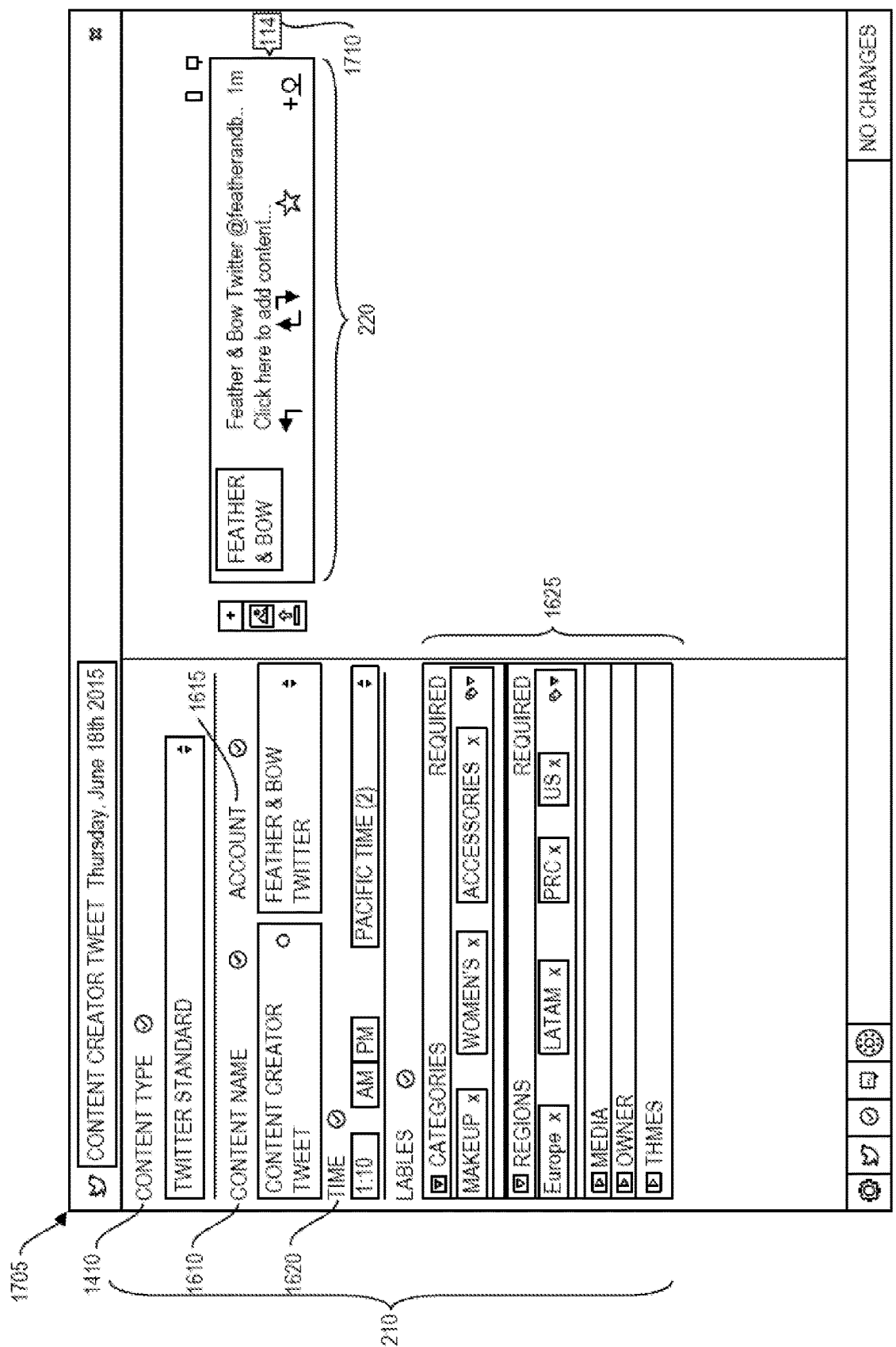

FIGS. 16 to 17 illustrate an example embodiment of various user interfaces (e.g., 1605 and 1705) of the multi-platform omni-channel content creator 102 of FIG. 1 including a metadata section (e.g., 210) and a simulated true-to-life preview section (e.g., 220) simultaneously displayed within a window of a display (e.g., 200 of FIG. 2). The metadata section 210 can include the content type 1410, the content name 1610, the account 1615, the time 1620, and tags 1625. The simulated true-to-life preview section 220 can show a piece of content and/or post as it would appear on the selected media platform associated with one or more channels. As shown in FIG. 17, an indicator 1710 can be shown to the side of the simulated section 220 indicating how many remaining characters can be added to a tweet, for example. The simulated true-to-life preview section 220 can simulate how the tweet will actually look after sending the tweet. The user interface logic section 108 (of FIG. 1) can interface with one or more users, receive information from the one or more users, cause information to be displayed on a display in accordance with the user interfaces 1505 and/or 1605, and cause information to be displayed within the user interface 1505 and/or 1605.

Figure 18:
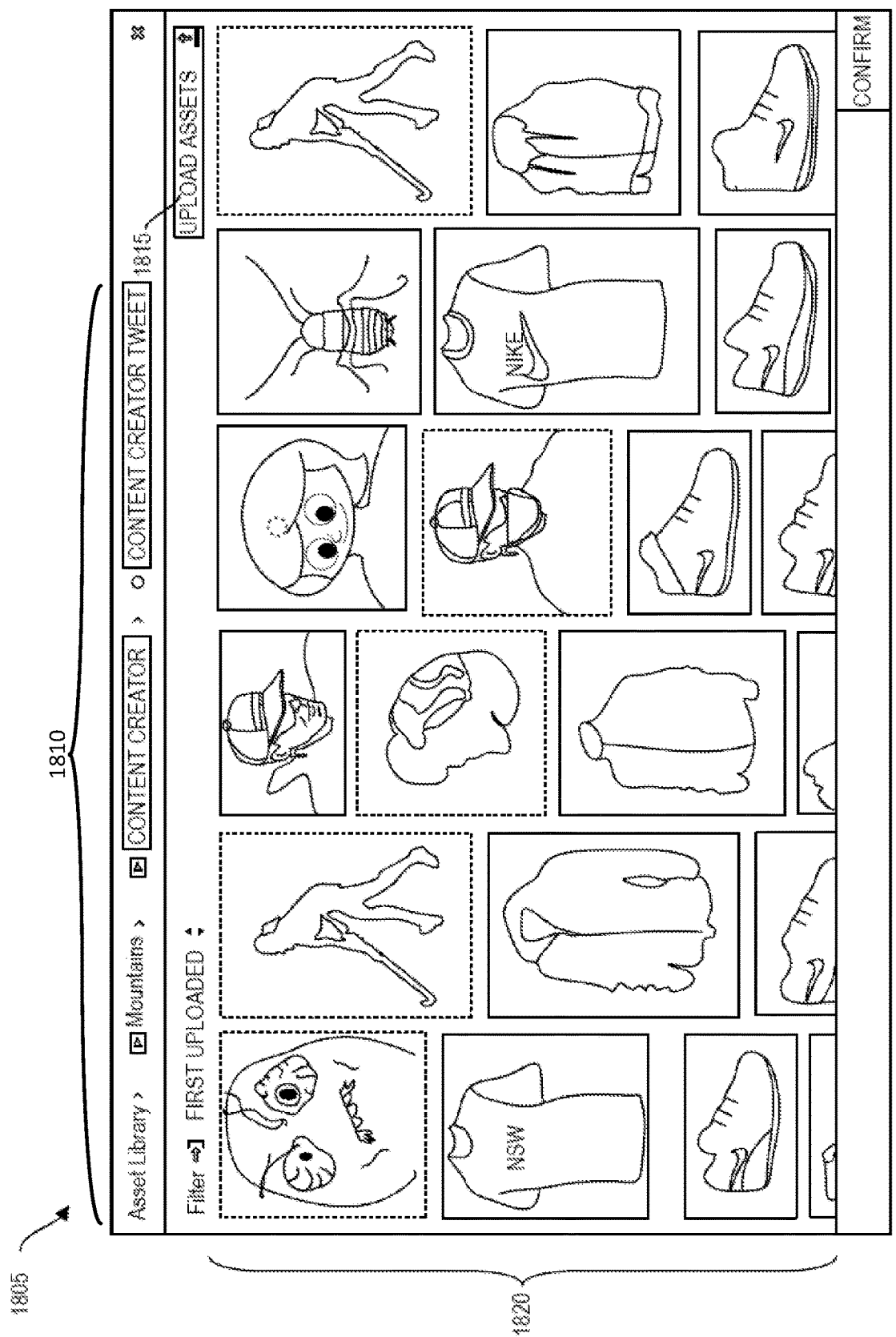
Figure 19:
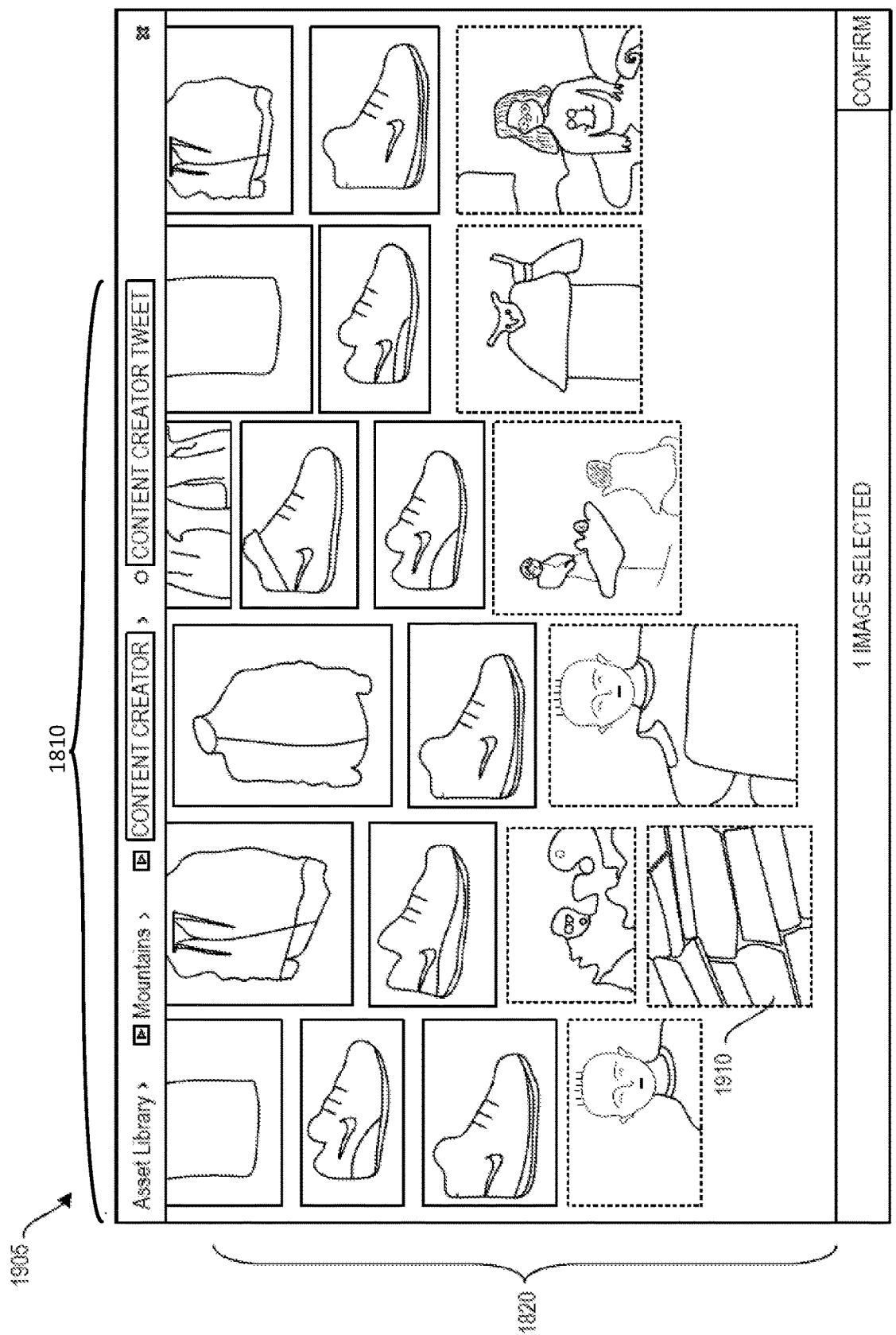
Figure 20:
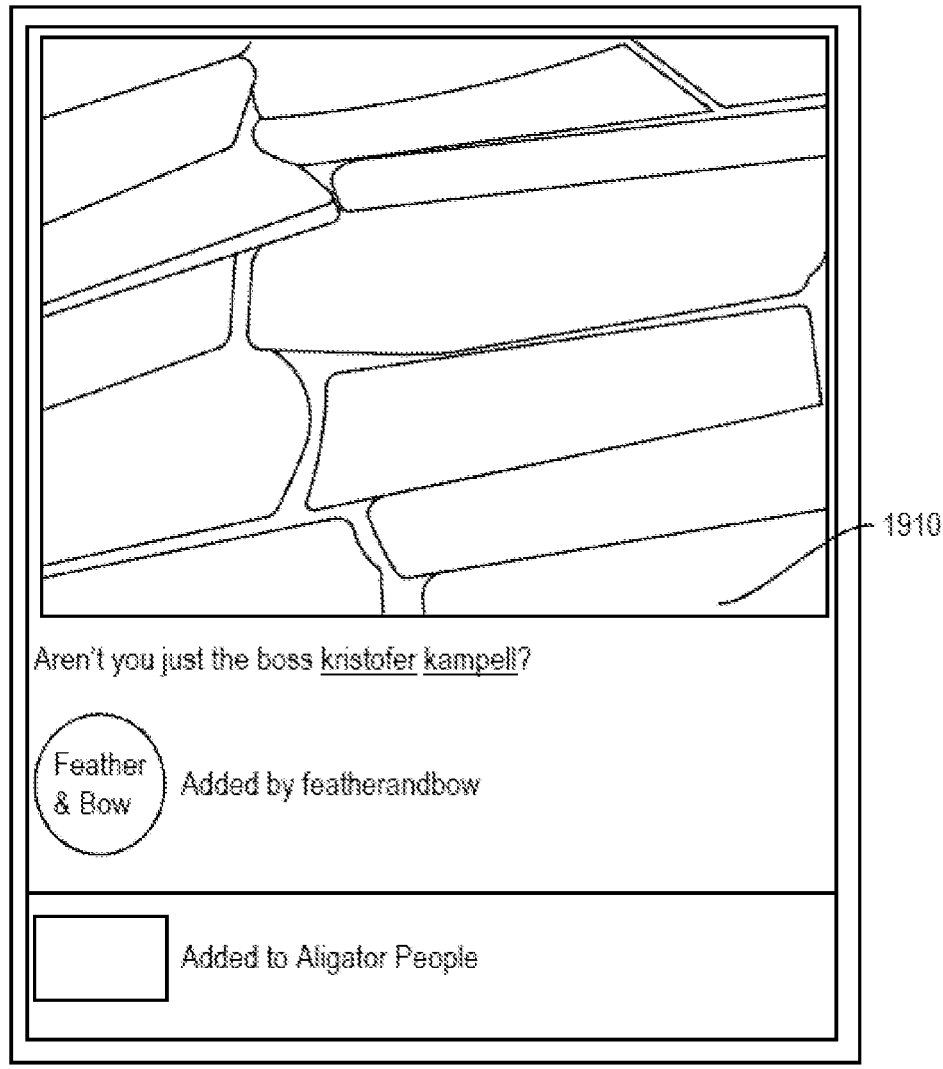

FIGS. 18-20 illustrate an example embodiment of user interfaces (e.g., 1805, 1905, and 2005, of the multi-platform omni-channel content creator 102 of FIG. 1 including an asset library, which can have various saved assets such as images, videos, or the like. The user interfaces 1805 and 1905 can include graphical and/or textual navigation information 1810, which can indicate the name of a content shell (e.g., "content creator tweet") and its hierarchical place within an asset library. Assets can be uploaded to the asset library using the upload assets 1815 selection. The asset library can hold media assets 1820 such as images, videos, or the like. A user can select a particular asset, such as image 1910 as shown in FIG. 19, from among the saved assets 1820 in the asset library. The selected asset (e.g., 1910) can be displayed in the user interface 2005 in association with a content shell, the simulated true-to-life preview section 220, or the like. The user interface logic section 108 (of FIG. 1) can interface with one or more users, receive information from the one or more users, cause information to be displayed on a display in accordance with the user interfaces 1805, 1905, and/or 2005, and cause information to be displayed within the user interface 1805, 1905, and/or 2005. In addition, asset licensing usage rights for particular images or video clips can be enforced based on geography or time. For example, if an asset such as an image is only licensed to a user organization within a certain geographic region such as North America, the asset library can enforce that limitation, either by prohibiting access to the image outside of North America, displaying an error message in the user interface, or both. Alternatively or in addition, if an asset such as an image is only licensed to a user organization for a certain period of time, the asset library can enforce that limitation, either by prohibiting access to the image outside of the licensed period of time, displaying an error message in the user interface, or both.

Figure 21:
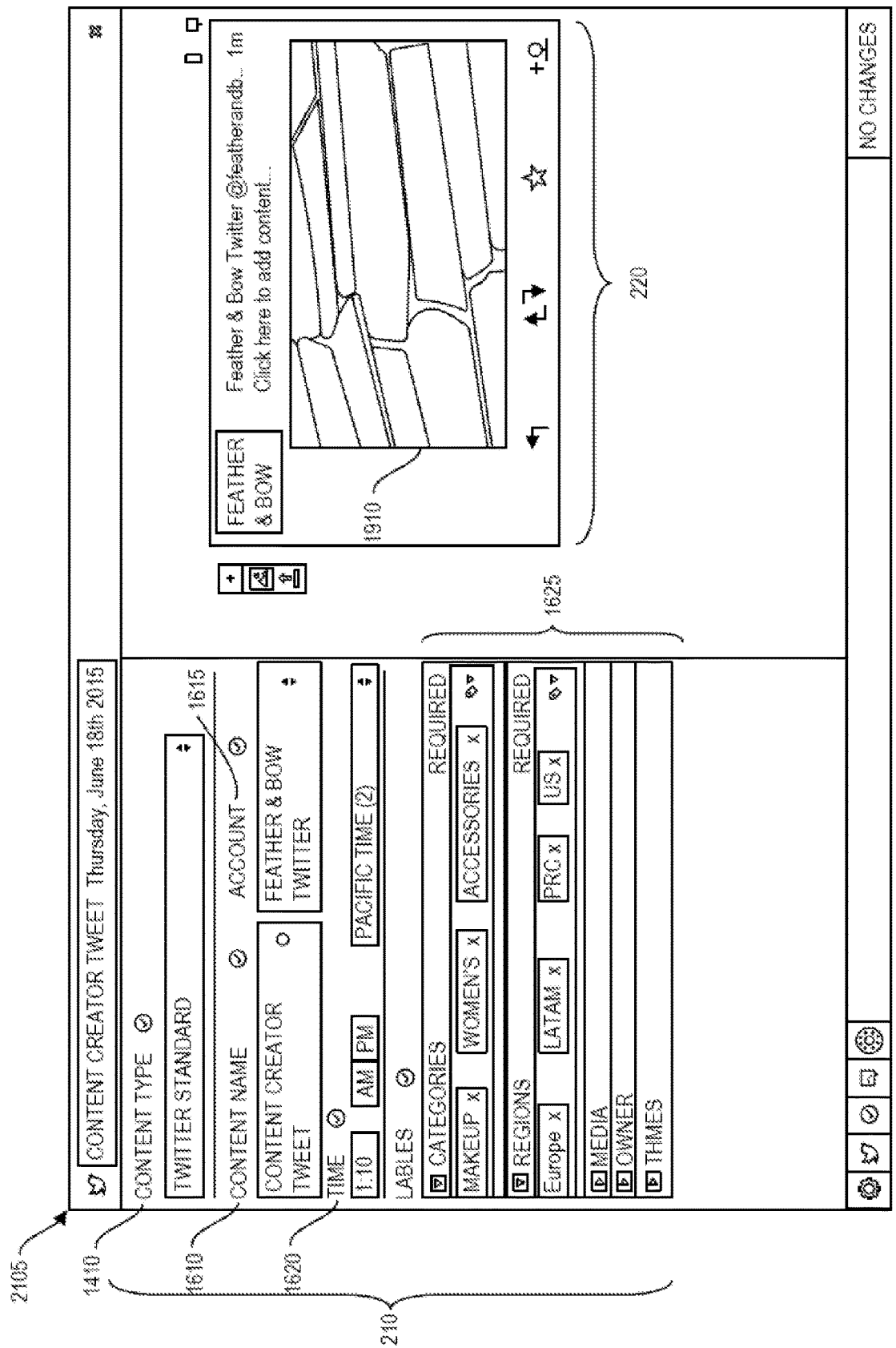

FIG. 21 illustrates an example embodiment of a user interface 2105 of the multi-platform omni-channel content creator 102 of FIG. 1 including the selected asset (i.e., image 1910) from the asset library (of FIGS. 18-20) displayed within the simulated true-to-life preview section 220. Some of the reference numerals and corresponding elements of FIG. 21 are described above, and therefore, a detailed description of such elements is not repeated. The user interface logic section 108 (of FIG. 1) can interface with one or more users, receive information from the one or more users, cause information to be displayed on a display in accordance with the user interface 2105, and cause information to be displayed within the user interface 2105.

Figure 22:
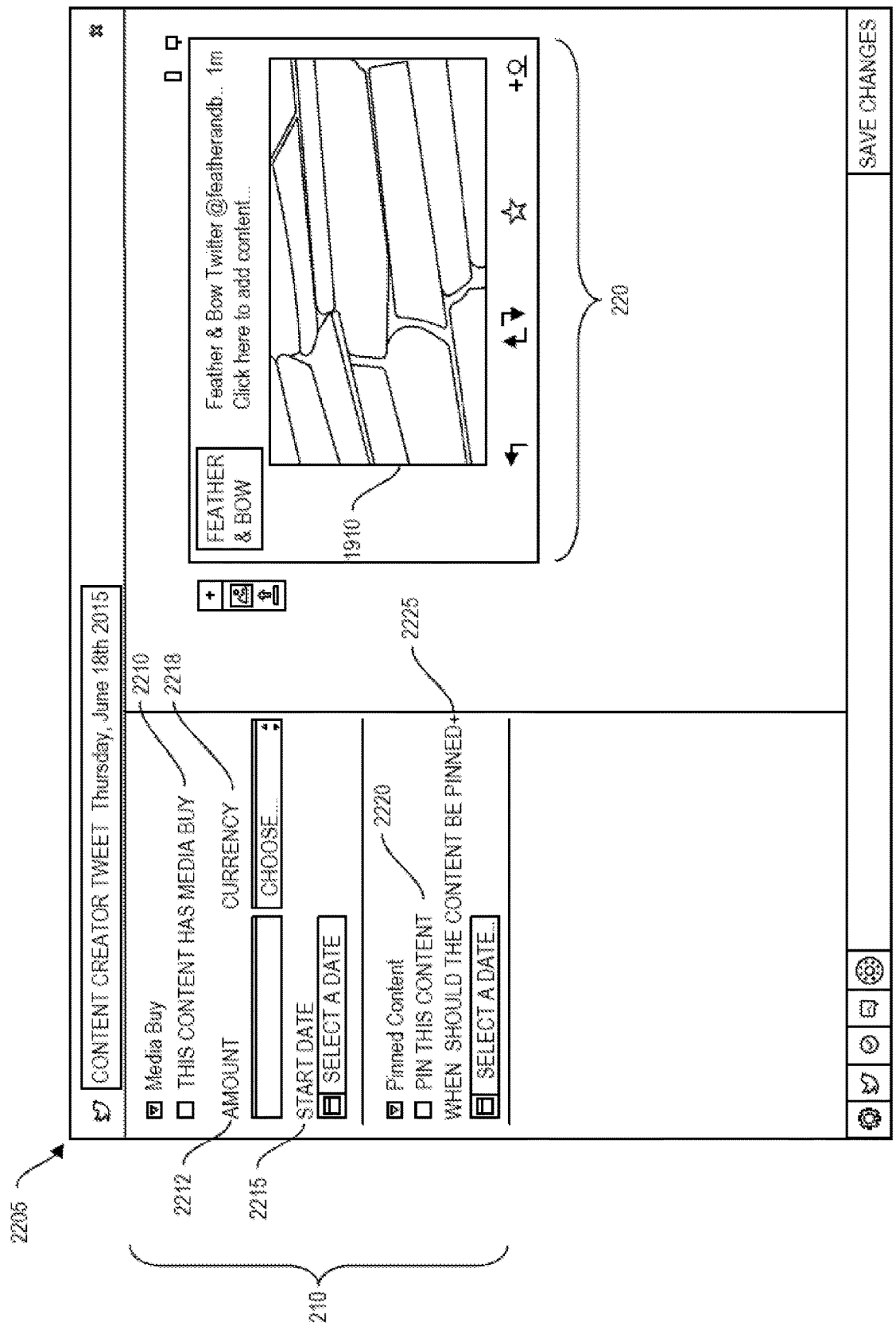

FIG. 22 illustrates an example embodiment of a user interface 2205 of the multi-platform omni-channel content creator 102 of FIG. 1 including a metadata section (e.g., 210) and a simulated true-to-life preview section (e.g., 220) simultaneously displayed within a window of a display (e.g., 200 of FIG. 2). The metadata section 210 can include a media buy option 2210 indicating that the particular content has a media buy associated with it, and a corresponding start date 2215. The user can enter an amount 2212 and a currency 2218 associated with the media buy 2210. For example, the amount 2212 can indicate a number of currency units, such as dollars. The metadata section 210 can include a pinned content option 2220 to cause the content to be pinned, and an associated pinned date 2225. The user and/or administrator can also configure options and/or fields that can be associated with the content. The user interface logic section 108 (of FIG. 1) can interface with one or more users, receive information from the one or more users, cause information to be displayed on a display in accordance with the user interface 2205, and cause information to be displayed within the user interface 2205.

Figure 23:
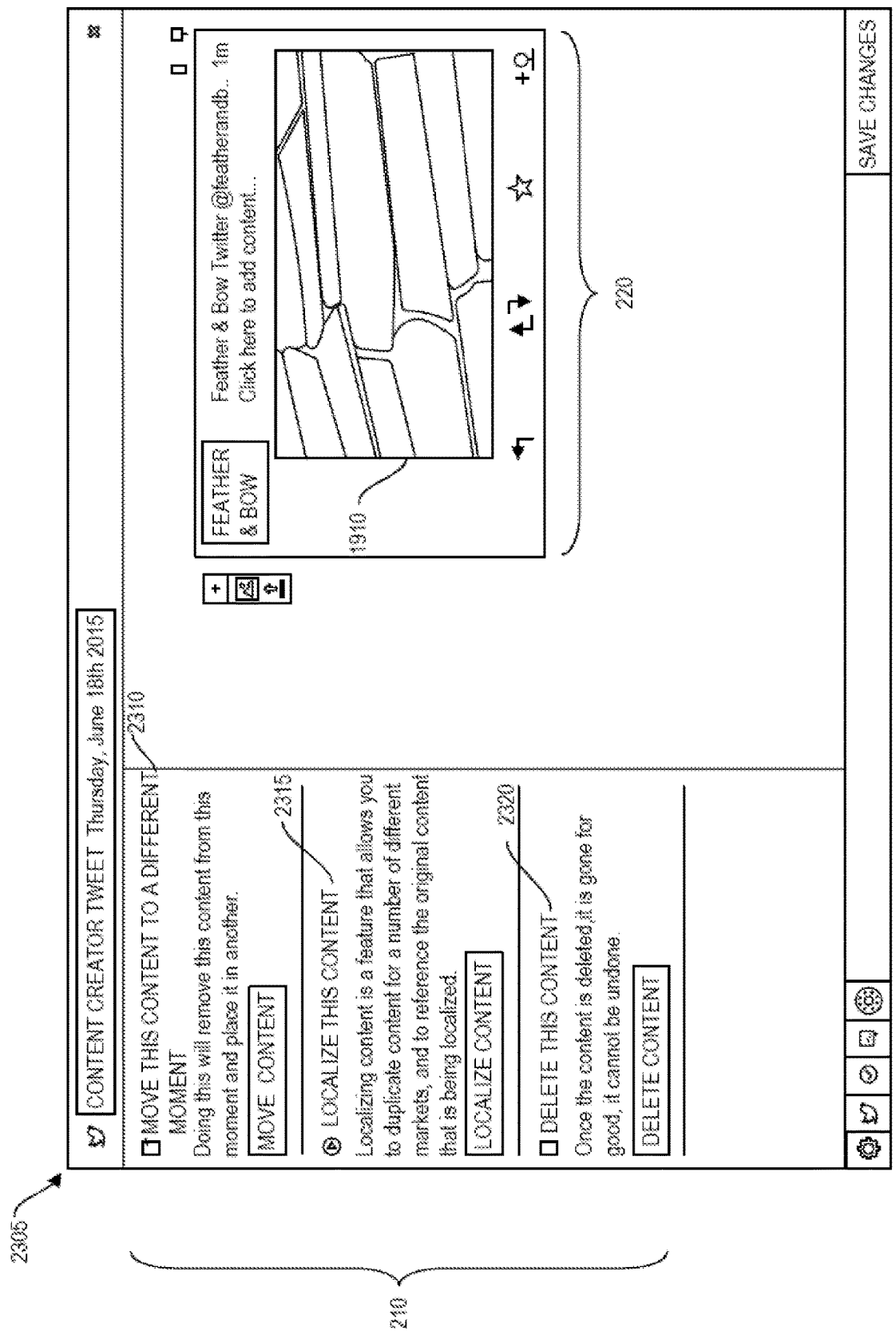

FIG. 23 illustrates an example embodiment of a user interface 2305 of the multi-platform omni-channel content creator 102 of FIG. 1 including a metadata section (e.g., 210) and a simulated true-to-life preview section (e.g., 220) simultaneously displayed within a window of a display (e.g., 200 of FIG. 2). The metadata section 210 can include an option 2310 to move the particular content to a different moment. For example, when a user selects the option 2310, the content creator 102 can remove the particular content and associate it with another moment. The metadata section 210 can include an option 2315 to localize the content for a different geographic or cultural region. For example, the content creator 102 can duplicate content for a number of different markets or geographic regions, with its own particular languages or customs, and also reference the original content that is localized. The metadata section 210 can include a delete option 2320 for deleting the particular content. The user interface logic section 108 (of FIG. 1) can interface with one or more users, receive information from the one or more users, cause information to be displayed on a display in accordance with the user interface 2305, and cause information to be displayed within the user interface 2305.

Figure 24:
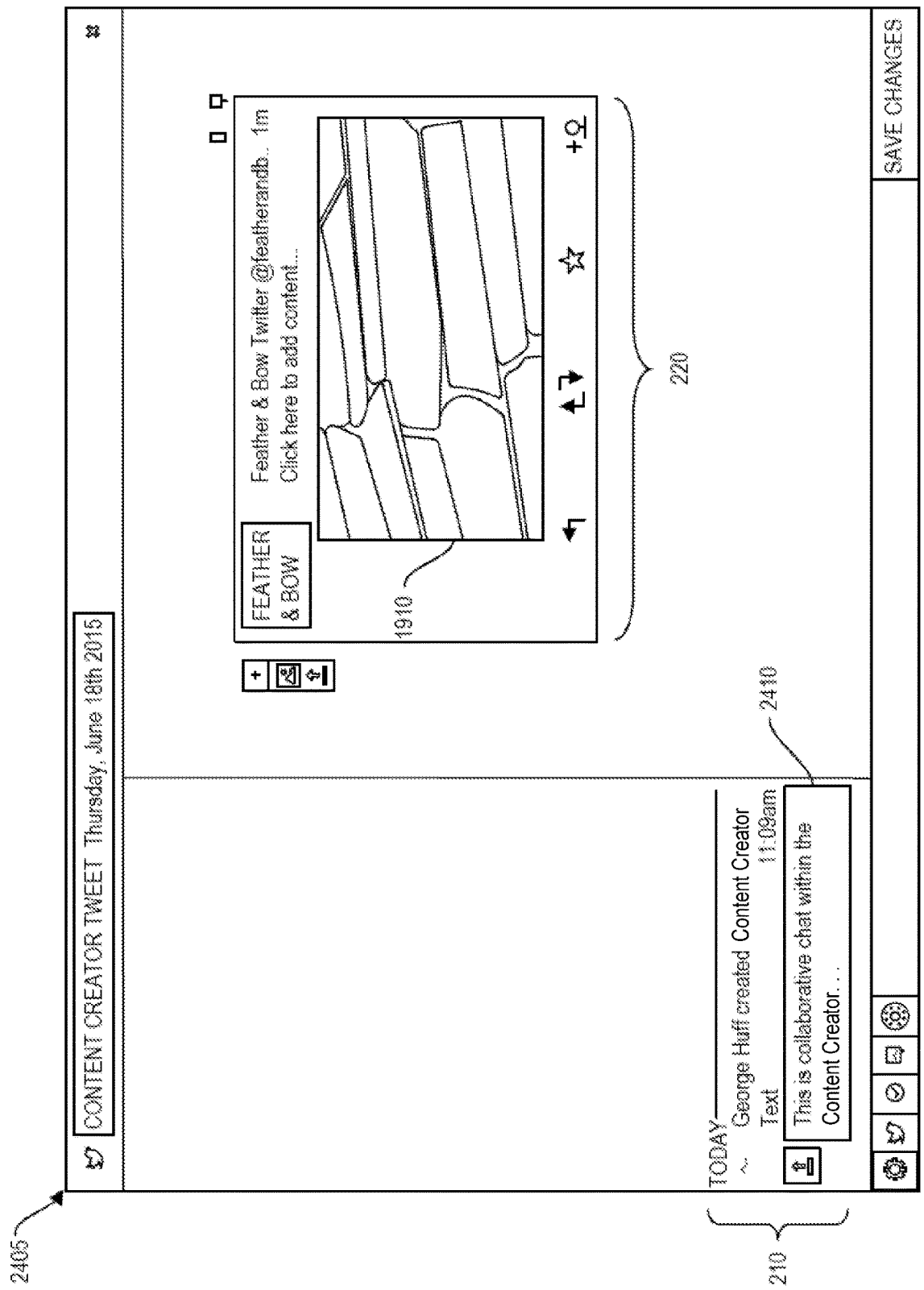

FIG. 24 illustrates an example embodiment of a user interface 2405 of the multi-platform omni-channel content creator 102 of FIG. 1 including a metadata section (e.g., 210) and a simulated true-to-life preview section (e.g., 220) simultaneously displayed within a window of a display (e.g., 200 of FIG. 2). The metadata section 210 can include a chat window 2410 within for real-time collaboration with other marketing personnel within the context of the particular piece of media content and/or post that is under development within the simulated true-to-life preview section 220. The user interface logic section 108 (of FIG. 1) can interface with one or more users, receive information from the one or more users, cause information to be displayed on a display in accordance with the user interface 2405, and cause information to be displayed within the user interface 2405.

Figure 25:
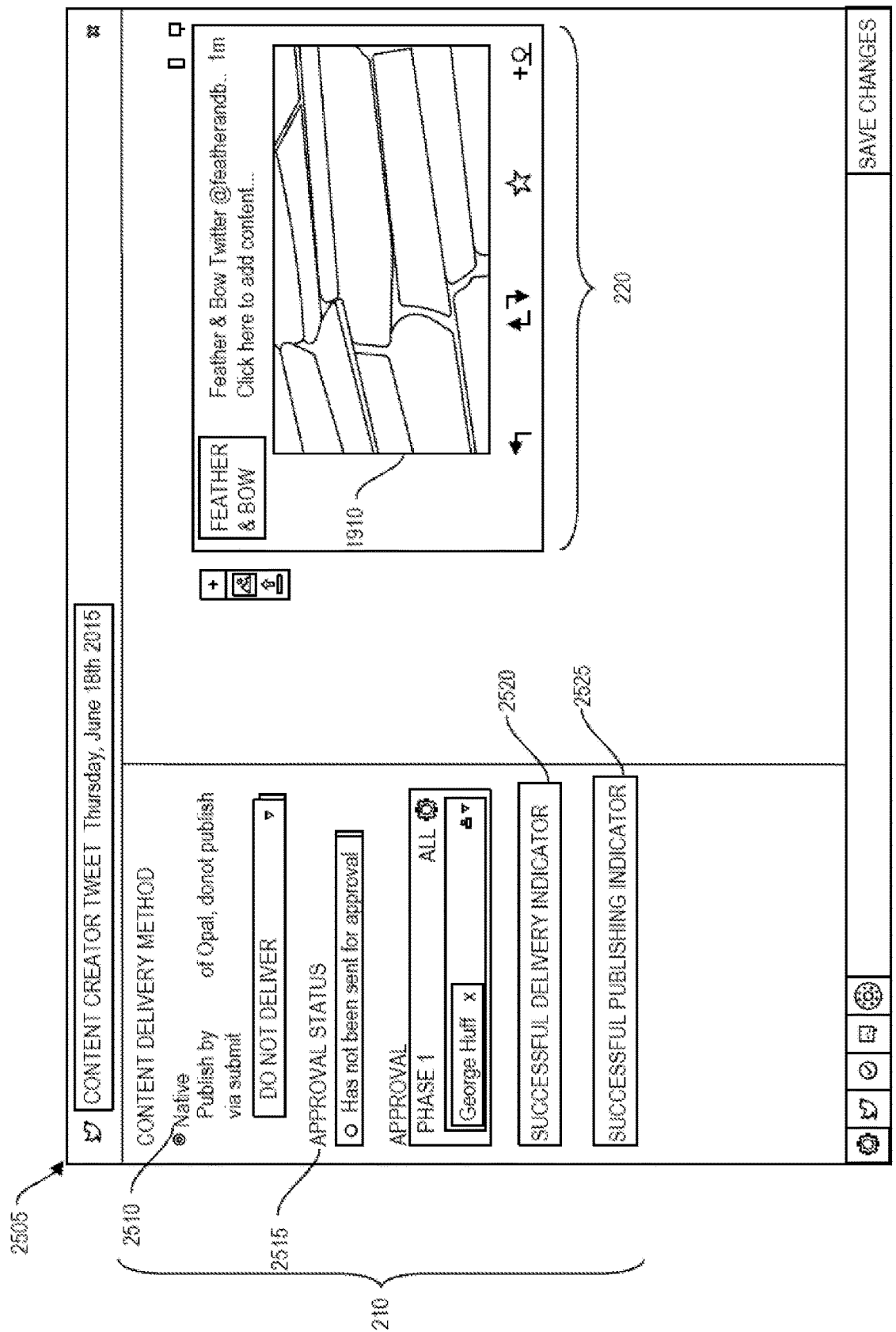

FIG. 25 illustrates an example embodiment of the multi-platform omni-channel content creator 102 of FIG. 1 including a metadata section (e.g., 210) and a simulated true-to-life preview section (e.g., 220) simultaneously displayed within a window of a display (e.g., 200 of FIG. 2). The metadata section 210 can include a native option 2510 indicating that the piece of content and/or post is to be published, distributed, and/or uploaded manually to a particular media platform associated with one or more channels. The metadata section 210 can include information regarding email publishing, website posting, decal printing, or the like. The metadata section 210 can include an approval status indicator 2515 of whether or not the particular piece of content and/or post has been approved by a manager or other person in charge of making approvals. In addition, the metadata section 210 can include a successful delivery indicator 2520, and/or a successful publishing indicator 2525. The successful publishing indicator 2525 can be dependent on, for example, a confirmation from a publisher via an interface with the publisher. The user interface logic section 108 (of FIG. 1) can interface with one or more users, receive information from the one or more users, cause information to be displayed on a display in accordance with the user interface 2505, and cause information to be displayed within the user interface 2505.

Figure 26:
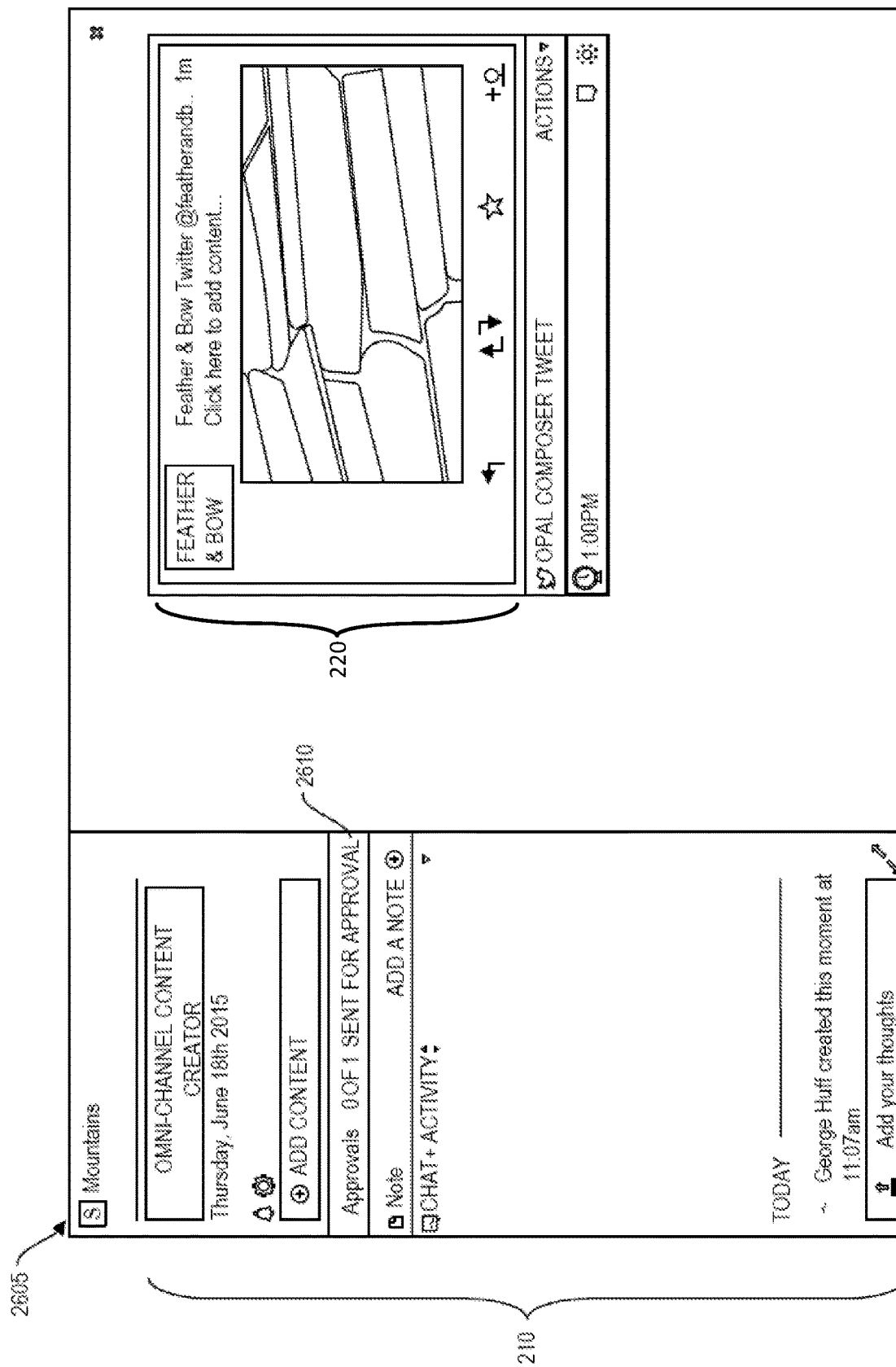

FIG. 26 illustrates an example embodiment of a user interface 2605 of the multi-platform omni-channel content creator 102 of FIG. 1 including a metadata section (e.g., 210) and a simulated true-to-life preview section (e.g., 220) simultaneously displayed within a window of a display (e.g., 200 of FIG. 2). The metadata section 210 can include an indicator 2610 of whether or not the particular piece of content and/or post has been sent for approval. By way of other examples, content delivery metadata (e.g., 210) can be provided across channels, metadata (e.g., 210) can be associated with approval status, and/or metadata (e.g., 210) can include status from an integrated $3^{rd}$ party. The user interface logic section 108 (of FIG. 1) can interface with one or more users, receive information from the one or more users, cause information to be displayed on a display in accordance with the user interface 2605, and cause information to be displayed within the user interface 2605.

Figure 27:
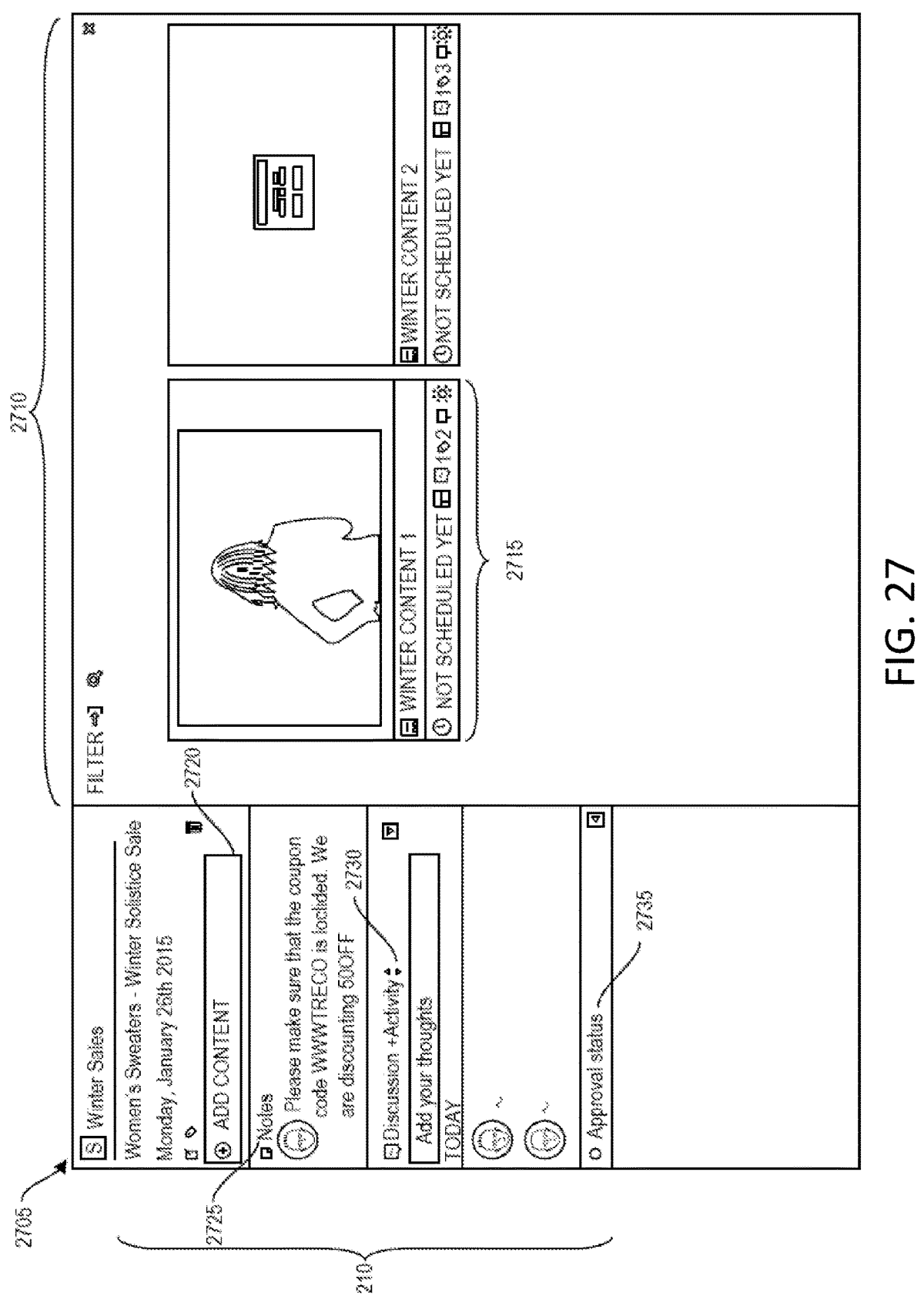

FIG. 27 illustrates an example embodiment of a user interface 2705 of the multi-platform omni-channel content creator 102 of FIG. 1 including a metadata section 210 and a moment view section 2710. When the user selects a piece of content (e.g., 2715) within the moment view section 2710 of FIG. 27, a composer view (such as shown in FIG. 16, FIG. 17, or FIG. 21) can open in which the user can see the simulated true-to-life preview section 220 and simultaneously edit the metadata sections 210 described herein. In some embodiments, the metadata section 210 can include an add content selection 2720 for adding new content to the moment view section 2710, a note section 2725 for making notes or reminders regarding the development and refinement of the content, a discussion and activity section 2730 for additional collaboration with other users and developers of the content, and/or an approval status section 2735 to track the approval status of the media content. The user interface logic section 108 (of FIG. 1) can interface with one or more users, receive information from the one or more users, cause information to be displayed on a display in accordance with the user interface 2705, and cause information to be displayed within the user interface 2705.

Figure 28:
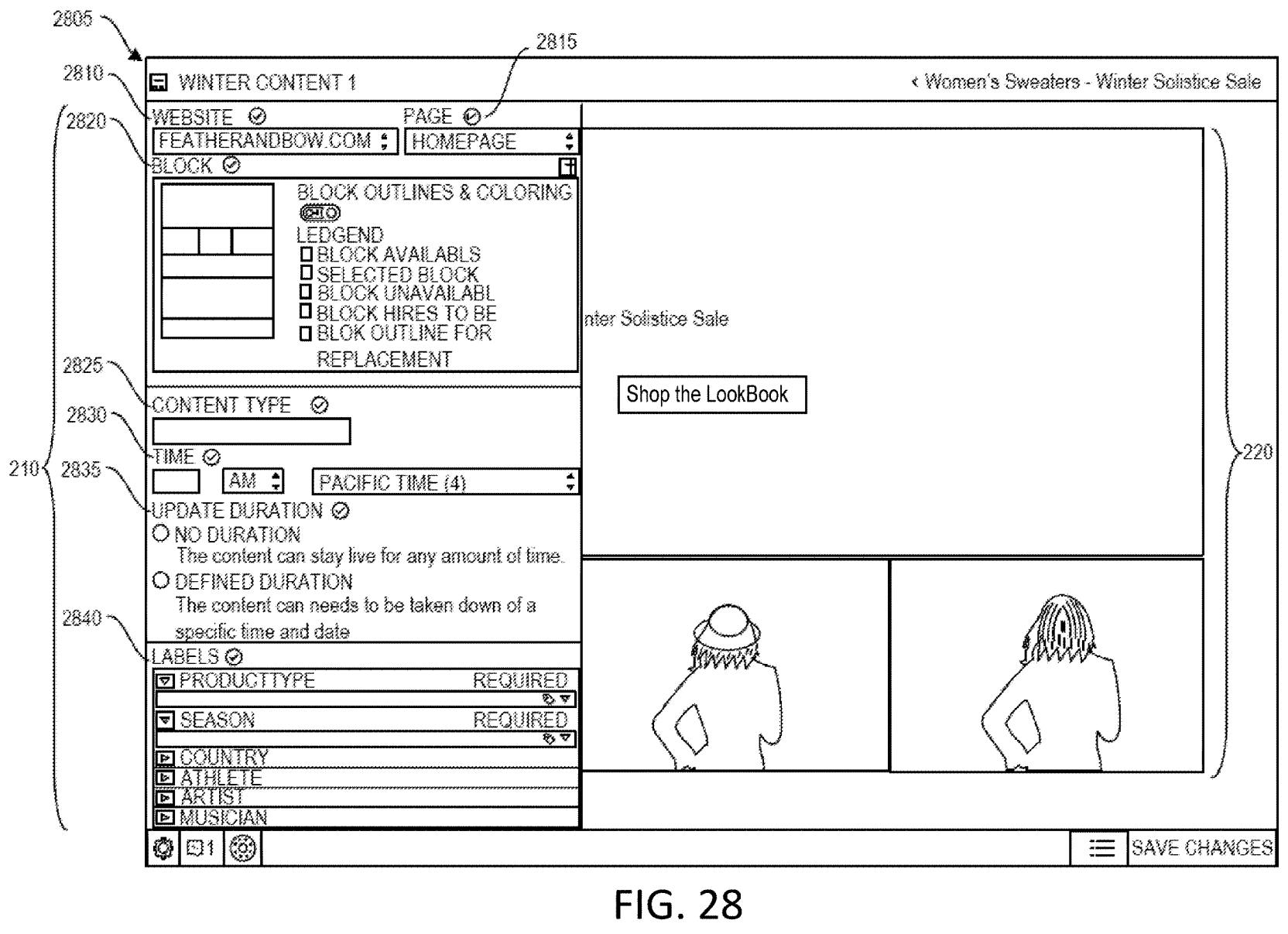

FIG. 28 illustrates an example embodiment of a user interface 2805 of the multi-platform omni-channel content creator 102 of FIG. 1 including a metadata section (e.g., 210) and a simulated true-to-life preview section (e.g., 220) simultaneously displayed within a window of a display. The metadata section 210 can include a website name section 2810 indicating a particular website or domain, a page section 2815 for indicating a particular webpage of the website, and a block editor section 2820 for editing the block outlines, coloring, and other arrangement details of a webpage. In addition, metadata section 210 can include a content name section 2825, a time stamp section 2830 indicating a timestamp associated with the content, an update duration section 2835 for indicating a duration of time in which the content can stay live, and a tags (i.e., labels) section 2840 for tagging the content with one or more identifying keywords. The simulated true-to-life preview section 220 can include all parts and/or portions of the website content. The user interface logic section 108 (of FIG. 1) can interface with one or more users, receive information from the one or more users, cause information to be displayed on a display in accordance with the user interface 2805, and cause information to be displayed within the user interface 2805.

Figure 29:
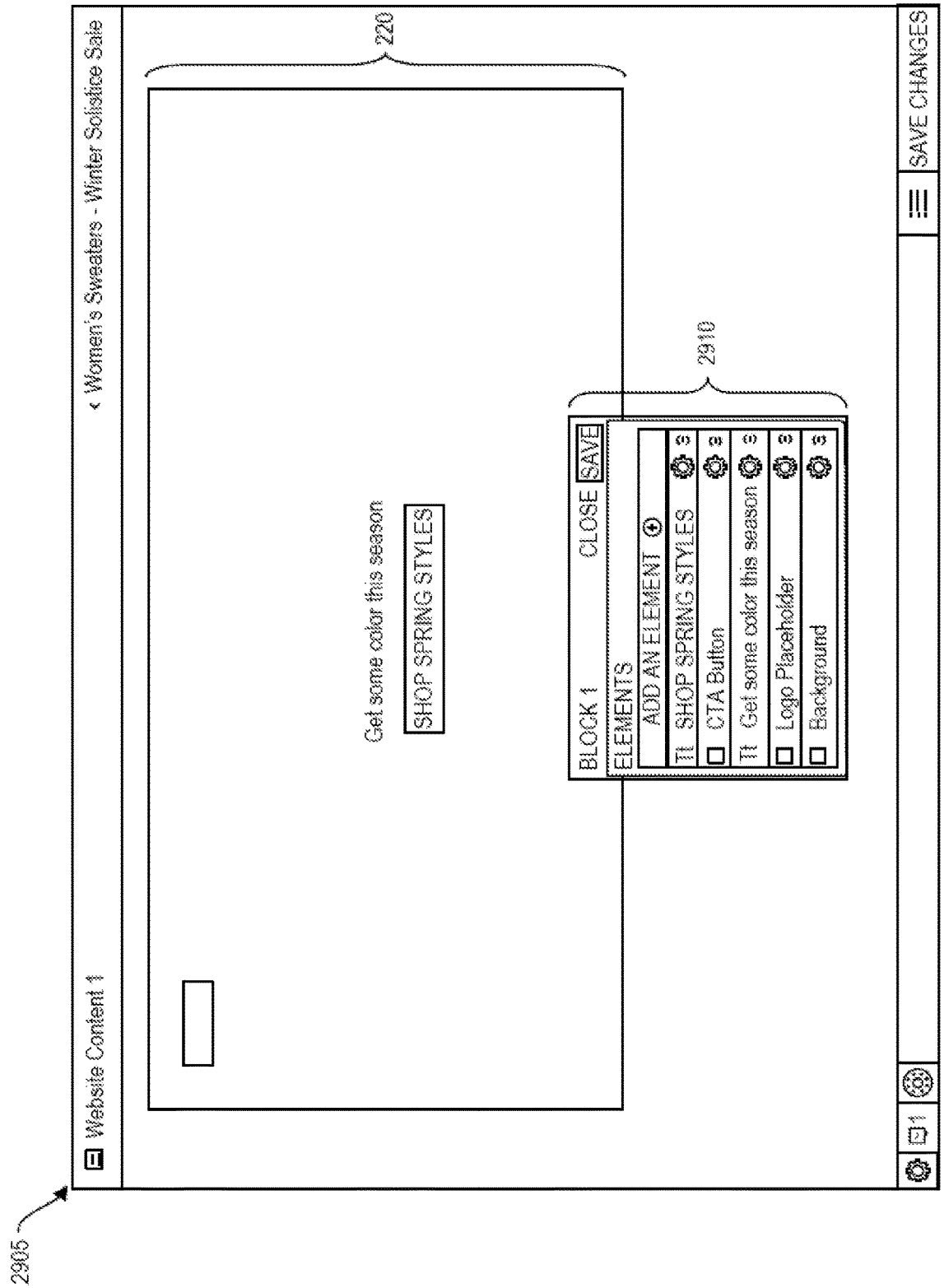

FIG. 29 illustrates an example embodiment of a user interface 2905 of the multi-platform omni-channel content creator 102 of FIG. 1 including a layer builder, which can include a simulated true-to-life preview section (e.g., 220) displayed within a window of a display. The simulated true-to-life preview section 220 can occupy substantially the entire window of the display, and can include, for example, the website content. Website elements can be directly added in the preview section 220 with an add-en-element overlay window 2910. The user interface logic section 108 (of FIG. 1) can interface with one or more users, receive information from the one or more users, cause information to be displayed on a display in accordance with the user interface 2905, and cause information to be displayed within the user interface 2905.

It will be understood that the multi-platform omni-channel media content creator 102 can generate content for social media, web, retail, email, print media, banner ads, configurable channels, localizations, or the like, all using the same fundamental tool and associated user interfaces as disclosed in detail herein.

Embodiments of the inventive concept include a multi-platform omni-channel content creation and distribution system. The system can include a multi-platform media content data and logic structure, a user interface logic section configured to interface with a user and the multi-platform media content data and logic structure, and a multi-sectional view configured to be shown on a display. The multi-sectional view can include a metadata section in a first section thereof and a simulated true-to-life preview section in a second section thereof. The user interface logic section can be configured to receive metadata information from the user. The metadata section can be configured to display the metadata information. The multi-platform media content data and logic structure can be configured to cause the simulated true-to-life preview section to show a piece of content with exact proportional dimensions and appearance as it would appear under actual non-simulated real-world circumstances for a particular media platform and associated physical device, and in accordance with the metadata.

In some embodiments, the user interface logic section is configured to detect a drag and drop of an image from the user onto the simulated true-to-life preview section. In some embodiments, the multi-platform media content data and logic structure is configured to cause the simulated true-to-life preview section to show the image within the piece of content with exact proportional dimensions and appearance as it would appear under actual non-simulated real-world circumstances for the particular media platform and the associated physical device.

In some embodiments, the user interface logic section is configured to detect a manipulation by the user of the image within the simulated true-to-life preview section. In some embodiments, the multi-platform media content data and logic structure is configured to cause the simulated true-to-life preview section to show the manipulated image within the piece of content with exact proportional dimensions and appearance as it would appear under actual non-simulated real-world circumstances for the particular media platform and the associated physical device.

In some embodiments, the user interface logic section is configured to detect a drag and drop of one or more images from the user onto a multi-image carousel disposed within the simulated true-to-life preview section. In some embodiments, the multi-platform media content data and logic structure is configured to cause the simulated true-to-life preview section to show the multi-image carousel within the piece of content with exact proportional dimensions and appearance as it would appear under actual non-simulated real-world circumstances for the particular media platform and the associated physical device.

In some embodiments, the user interface logic section is configured to detect a manipulation by the user of the multi-image carousel within the simulated true-to-life preview section. In some embodiments, the multi-platform media content data and logic structure is configured to cause the simulated true-to-life preview section to show the manipulated multi-image carousel within the piece of content with exact proportional dimensions and appearance as it would appear under actual non-simulated real-world circumstances for the particular media platform and the associated physical device.

In some embodiments, the user interface logic section is configured to detect a drag and drop of a video clip from the user onto the simulated true-to-life preview section. In some embodiments, the multi-platform media content data and logic structure is configured to cause the simulated true-to-life preview section to show the video clip within the piece of content with exact proportional dimensions and appearance as it would appear under actual non-simulated real-world circumstances for the particular media platform and the associated physical device.

In some embodiments, the user interface logic section is configured to detect a manipulation by the user of the video clip within the simulated true-to-life preview section. In some embodiments, the multi-platform media content data and logic structure is configured to cause the simulated true-to-life preview section to show the manipulated video clip within the piece of content with exact proportional dimensions and appearance as it would appear under actual non-simulated real-world circumstances for the particular media platform and the associated physical device.

In some embodiments, the user interface logic section is configured to detect at least one of an add media content selection, an edit media content selection, a preview media content selection, or a delete media content selection by the user. In some embodiments, the multi-platform media content data and logic structure is configured to cause the simulated true-to-life preview section to reflect the added media content, the edited media content, the previewed media content, or the deleted media content within the simulated true-to-life preview section with exact proportional dimensions and appearance as it would appear under actual non-simulated real-world circumstances for the particular media platform and the associated physical device.

In some embodiments, the particular media platform is associated with a social media channel, and the physical device is at least one of a smart phone, a tablet, a laptop computer, or a desktop computer. In some embodiments, the particular media platform is associated with an email channel, and the physical device is at least one of a smart phone, a tablet, a laptop computer, or a desktop computer. In some embodiments, the particular media platform is associated with a web channel, and the physical device is at least one of a smart phone, a tablet, a laptop computer, or a desktop computer. In some embodiments, the particular media platform is associated with a print channel, and the physical device is a printer. In some embodiments, the particular media platform is associated with a billboard channel, and the physical device is a billboard.

The multi-platform media content data and logic structure can include an account logic section configured to receive an input selection from the user of a particular account from among a plurality of accounts of the particular media platform. The account logic section can be further configured to cause the selected account to be displayed in an account region within the multi-sectional view, and to cause the piece of content to have exact proportional dimensions and appearance as it would appear under actual non-simulated real-world circumstances for the selected account for the particular media platform and associated physical device. The multi-platform media content data and logic structure can include a content type logic section configured to receive a content type selection from the user of a particular content type from among a plurality of content types of the particular media platform. The content type logic section can be further configured to cause the selected content type to be displayed as it would appear under actual non-simulated real-world circumstances for the selected account for the particular media platform and associated physical device.

The multi-platform media content data and logic structure can include one or more objects associated with the piece of content. The multi-platform media content data and logic structure can include metadata including the received metadata information from the user and other metadata information that describes one or more aspects of the piece of content. The multi-platform media content data and logic structure can include one or more tags including keywords that are relevant to the piece of content.

The multi-platform omni-channel content creation and distribution system can further include edit controls configured to be displayed adjacent to the simulated true-to-life preview section, wherein the edit controls are configured to provide editing capability to the user to edit the piece of content within the simulated true-to-life preview section. The multi-platform omni-channel content creation and distribution system can further include a work station including a composer logic section accessible by the user, wherein the composer logic section includes a multi-platform omni-channel content creator. The multi-platform omni-channel content creation and distribution system can further include a plurality of templates accessible via the work station by the user, wherein each of the templates corresponds to a predefined layout configuration of the piece of content for a corresponding media platform from among a plurality of media platforms.

In some embodiments, in response to a first channel selection by the user, the particular media platform is associated with a social media channel. In some embodiments, in response to a second channel selection by the user, the particular media platform is associated with an email channel. In some embodiments, in response to a third channel selection by the user, the particular media platform is associated with a web channel. In some embodiments, in response to a fourth channel selection by the user, the particular media platform is associated with a print channel. In some embodiments, in response to a fifth channel selection by the user, the particular media platform is associated with a billboard channel. In some embodiments, the physical device is at least one of a smart phone, a tablet, a laptop computer, a desktop computer, a printer, or a billboard.

Embodiments of the inventive concept can include a computer-implemented method for creating multi-platform omni-channel media content. The method can include receiving and processing, by a user interface logic section, a user selection from a user of a particular media platform from among a plurality of media platforms. The method can include storing, by a storage device, the user selection of the particular media platform. The method can include receiving, by the user interface logic section, uploaded content from the user. The method can include displaying, by a display device, a multi-sectional view including a metadata section in a first section thereof and a simulated true-to-life preview section in a second section thereof, wherein the simulated true-to-life preview section includes the uploaded content.

In some embodiments, the method can include receiving, by the user interface logic section, metadata information from the user. The method can include displaying, by the display device, the metadata information in the metadata section. The method can include causing, by a multi-platform media content data and logic structure, the simulated true-to-life preview section to show a piece of content with exact proportional dimensions and appearance as it would appear under actual non-simulated real-world circumstances for the particular media platform and associated physical device.

In some embodiments, the method can include receiving, by the user interface logic section, user edits. The method can include editing inline, within the simulated true-to-life preview section, the piece of content in accordance with the user edits. The method can include previewing, by the simulated true-to-life preview section, the piece of content in real-time. The method can include saving, by the storage device, the piece of content. The method can include collaborating, by multiple users in a real-time chat window within the multi-sectional view, about the piece of content. The method can include attributing the piece of content with metadata including one or more tags. The method can include attributing the piece of content with metadata including one or more approvers. The method can include sending, by an approval logic section, the piece of content to one or more content approvers. The method can include registering, by the approval logic section, an approval status of the piece of content. The method can include, in response to a positive approval status, distributing, by a distribution logic section, the approved piece of content to the particular media platform for publishing under actual non-simulated real-world circumstances.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. A multi-platform omni-channel content creation and distribution system, comprising:
    a non-transitory machine-readable medium comprising instructions executable by one or more processors, the instructions including:
    a multi-platform media content data and logic structure;
    a user interface logic section configured to interface with a user and the multi-platform media content data and logic structure; and
    a multi-sectional view configured to be shown on a display, the multi-sectional view including a metadata section in a first section thereof and a simulated true-to-life preview section in a second section thereof,
    wherein the user interface logic section is configured to receive metadata information from the user, the metadata section is configured to display the metadata information, and the multi-platform media content data and logic structure is configured to cause the simulated true-to-life preview section to show media content with exact proportional dimensions and appearance as it would appear under actual non-simulated real-world circumstances for a particular media platform and associated physical device, and in accordance with the metadata,
    wherein:
    the user interface logic section is configured to detect a drag and drop of an image from the user onto the simulated true-to-life preview section;
    the multi-platform media content data and logic structure is configured to cause the simulated true-to-life preview section to show the image within the media content with exact proportional dimensions and appearance as it would appear under actual non-simulated real-world circumstances for the particular media platform and the associated physical device;
    the user interface logic section is configured to detect a manipulation by the user of the image within the simulated true-to-life preview section;
    the multi-platform media content data and logic structure is configured to cause the simulated true-to-life preview section to show the manipulated image within the media content with exact proportional dimensions and appearance as it would appear under actual non-simulated real-world circumstances for the particular media platform and the associated physical device;
    the user interface logic section is configured to detect a drag and drop of one or more images from the user onto a multi-image carousel disposed within the simulated true-to-life preview section;
    the multi-platform media content data and logic structure is configured to cause the simulated true-to-life preview section to show the multi-image carousel within the media content with exact proportional dimensions and appearance as it would appear under actual non-simulated real-world circumstances for the particular media platform and the associated physical device;
    the user interface logic section is configured to detect a manipulation by the user of the multi-image carousel within the simulated true-to-life preview section;
    the multi-platform media content data and logic structure is configured to cause the simulated true-to-life preview section to show the manipulated multi-image carousel within the media content with exact proportional dimensions and appearance as it would appear under actual non-simulated real-world circumstances for the particular media platform and the associated physical device;
    the user interface logic section is configured to detect a drag and drop of a video clip from the user onto the simulated true-to-life preview section;
    the multi-platform media content data and logic structure is configured to cause the simulated true-to-life preview section to show the video clip within the media content with exact proportional dimensions and appearance as it would appear under actual non-simulated real-world circumstances for the particular media platform and the associated physical device;
    the user interface logic section is configured to detect a manipulation by the user of the video clip within the simulated true-to-life preview section;
    the multi-platform media content data and logic structure is configured to cause the simulated true-to-life preview section to show the manipulated video clip within the media content with exact proportional dimensions and appearance as it would appear under actual non-simulated real-world circumstances for the particular media platform and the associated physical device;
    the user interface logic section is configured to detect at least one of an add media content selection, an edit media content selection, a preview media content selection, or a delete media content selection by the user;
    the multi-platform media content data and logic structure is configured to cause the simulated true-to-life preview section to reflect the added media content, the edited media content, the previewed media content, or the deleted media content within the simulated true-to-life preview section with exact proportional dimensions and appearance as it would appear under actual non-simulated real-world circumstances for the particular media platform and the associated physical device;

in response to a first channel selection by the user, the particular media platform is associated with a social media channel;

in response to a second channel selection by the user, the particular media platform is associated with an email channel;

in response to a third channel selection by the user, the particular media platform is associated with a web channel;

in response to a fourth channel selection by the user, the particular media platform is associated with a print channel;

in response to a fifth channel selection by the user, the particular media platform is associated with a billboard channel;

the physical device is at least one of a smart phone, a tablet, a laptop computer, a desktop computer, a printer, or a billboard;

the metadata section in the first section of the multi-sectional view and the simulated true-to-life preview section including all of the media content in the second section of the multi-sectional view are simultaneously visible in their entirety on the display;

in direct response to the metadata being entered into the metadata section by the user, the multi-platform media content data and logic structure is configured to automatically cause the simulated true-to-life preview section to be updated in real-time, wherein the metadata section in the first section of the multi-sectional view includes an approvals section to request approval by a person having approving authority, and an approval status indicator that indicates whether or not the media content has been approved by the person having approving authority; and wherein the metadata section in the first section of the multi-sectional view includes a successful publishing indicator that is dependent on a confirmation from a publisher via an interface with the publisher that the media content has been published.

2. A computer-implemented method for creating multi-platform omni-channel media content, the method comprising:

receiving and processing, by a user interface logic section, a user selection from a user of a particular media platform from among a plurality of media platforms;

storing, by a storage device, the user selection of the particular media platform;

receiving, by the user interface logic section, uploaded content from the user; and displaying, by a display device, a multi-sectional view including a metadata section in a first section thereof and a simulated true-to-life preview section in a second section thereof, wherein the simulated true-to-life preview section includes the uploaded content;

receiving, by the user interface logic section, metadata information from the user;

displaying, by the display device, the metadata information in the metadata section;

causing, by a multi-platform media content data and logic structure, the simulated true-to-life preview section to show media content with exact proportional dimensions and appearance as it would appear under actual non-simulated real-world circumstances for the particular media platform and associated physical device;

wherein displaying on the display device includes simultaneously displaying the metadata section in the first section of the multi-sectional view and the simulated true-to-life preview section including all of the media content in the second section of the multi-sectional view in their entirety on the display;

wherein in direct response to the metadata being entered into the metadata section by the user, automatically causing, by the multi-platform media content data and logic structure, the simulated true-to-life preview section to be updated in real-time;

wherein displaying the metadata section in the first section of the multi-sectional view includes displaying an approvals section to request approval by a person having approving authority, and displaying an approval status indicator that indicates whether or not the media content has been approved by the person having approving authority; and wherein displaying the metadata section in the first section of the multi-sectional view includes displaying a successful publishing indicator that is dependent on a confirmation from a publisher via an interface with the publisher that the media content has been published.

3. The method of claim 2, further comprising:

receiving, by the user interface logic section, user edits;

editing inline, within the simulated true-to-life preview section, the media content in accordance with the user edits;

previewing, by the simulated true-to-life preview section, the media content in real-time;

saving, by the storage device, the media content;

collaborating, by multiple users in a real-time chat window within the multi-sectional view, about the media content;

attributing the media content with metadata including one or more tags;

attributing the media content with metadata including one or more approvers;

sending, by an approval logic section, the media content to one or more content approvers;

registering, by the approval logic section, an approval status of the media content; and in response to a positive approval status, automatically distributing, by a distribution logic section, the approved media content to the particular media platform for publishing under actual non-simulated real-world circumstances.

4. The multi-platform omni-channel content creation and distribution system of claim 1, wherein the metadata section includes:

a media buy option indicating that the media content has a media buy associated with it;

a start date corresponding with the media buy option;

a pinned content option to cause the media content to be pinned; and a pinned date associated with the pinned content option.

5. The method of claim 2, further comprising:

receiving, by an account logic section, an input selection from the user of a particular account from among a plurality of accounts of the particular media platform;

causing, by the account logic section, the selected account to be simultaneously visible in an account region within the multi-sectional view simultaneously with the metadata section being visible in the first section of the multi-sectional view in their entirety on the display;

causing, by the account logic section, the selected account to be simultaneously visible in the account region within the multi-sectional view simultaneously with the simulated true-to-life preview section including all of the media content in the second section of the multi-sectional view being visible in the first section of the multi-sectional view in their entirety on the display;
causing the media content to have exact proportional dimensions and appearance as it would appear under actual non-simulated real-world circumstances for the selected account for the particular media platform and associated physical device;
receiving, by a content type logic section, a content type selection from the user of a particular content type from among a plurality of content types of the particular media platform; and
causing, by the content type logic section, the selected content type to be displayed as it would appear under actual non-simulated real-world circumstances for the selected account for the particular media platform and associated physical device.

6. The method of claim 2, further comprising:
displaying edit controls such that the edit controls are simultaneously visible in their entirety adjacent to the simulated true-to-life preview section while the metadata section in the first section of the multi-sectional view and the simulated true-to-life preview section including all of the media content in the second section of the multi-sectional view are simultaneously visible in their entirety on the display; and
providing editing capability, by the edit controls, to the user to edit the media content within the simulated true-to-life preview section.

7. The method of claim 2, further comprising:
indicating, in a website name section of the meta data section, a particular website;
indicating, in a page section of the metadata section, a particular webpage of the particular website;
indicating, by a time stamp section of the metadata section, a timestamp associated with the media content;
indicating, by an update duration section of the metadata section, a duration of time in which the media content stays live;
tagging, by a tags section of the metadata section, the media content with one or more identifying keywords; and
storing the particular webpage, the timestamp, the duration of time, and the one or more identifying keywords in the storage device.

8. The method of claim 2, wherein the metadata section includes a content type section, the method further comprising:
in direct response to a content type selection being entered into the metadata section by the user, automatically causing, by the multi-platform media content data and logic structure, the simulated true-to-life preview section to be updated in real-time.

9. The method of claim 2, wherein the metadata section includes a regions section, the method further comprising:
in direct response to a regions selection being entered into the metadata section by the user, automatically causing, by the multi-platform media content data and logic structure, the simulated true-to-life preview section to be updated in real-time.

10. The method of claim 2, wherein the metadata section includes a labels section, the method further comprising:
in direct response to one or more labels being entered into the metadata section by the user, automatically causing, by the multi-platform media content data and logic structure, the simulated true-to-life preview section to be updated in real-time.

11. The method of claim 3, further comprising simultaneously displaying the real-time chat window in the multi-sectional view on the display device simultaneously with the simulated true-to-life preview section being visible in the multi-sectional view on the display device.

12. The multi-platform omni-channel content creation and distribution system of claim 1, wherein the multi-platform media content data and logic structure includes:
an account logic section configured to receive an input selection from the user of a particular account from among a plurality of accounts of the particular media platform;
wherein the account logic section is further configured to cause the selected account to be simultaneously visible in an account region within the multi-sectional view simultaneously with the metadata section being visible in the first section of the multi-sectional view in their entirety on the display;
wherein the account logic section is further configured to cause the selected account to be simultaneously visible in the account region within the multi-sectional view simultaneously with the simulated true-to-life preview section being visible including all of the media content in the second section of the multi-sectional view in their entirety on the display;
wherein the account logic section is configured to cause the media content to have exact proportional dimensions and appearance as it would appear under actual non-simulated real-world circumstances for the selected account for the particular media platform and associated physical device;
further comprising a content type logic section configured to receive a content type selection from the user of a particular content type from among a plurality of content types of the particular media platform, wherein the content type logic section is further configured to cause the selected content type to be displayed as it would appear under actual non-simulated real-world circumstances for the selected account for the particular media platform and associated physical device;
wherein the content type logic section is further configured to cause the selected content type to be simultaneously visible in a content type region within the multi-sectional view simultaneously with the metadata section being visible in the first section of the multi-sectional view in their entirety on the display;
wherein the content type logic section is further configured to cause the selected content type to be simultaneously visible in the content type region within the multi-sectional view simultaneously with the simulated true-to-life preview section being visible including all of the media content in the second section of the multi-sectional view in their entirety on the display; and
wherein the content type logic section is configured to cause the media content to have exact proportional dimensions and appearance as it would appear under actual non-simulated real-world circumstances for the selected content type for the particular media platform and associated physical device.

13. The multi-platform omni-channel content creation and distribution system of claim 1, wherein the multi-platform media content data and logic structure includes:
one or more objects associated with the media content, wherein the one or more objects are layered one on top of another within the simulated true-to-life preview section;

metadata including the received metadata information from the user; and one or more tags including one or more keywords that are relevant to the media content, wherein the one or more keywords are relevant to a textual description of the media content, and wherein the one or more keywords identify the media content.

14. The multi-platform omni-channel content creation and distribution system of claim 1, further comprising:

edit controls configured to be simultaneously visible in their entirety adjacent to the simulated true-to-life preview section simultaneously with the metadata section being visible in the first section of the multi-sectional view in their entirety on the display;

wherein the edit controls are configured to be simultaneously visible in their entirety with the simulated true-to-life preview section including all of the media content in the second section of the multi-sectional view in their entirety on the display;

wherein the edit controls are configured to provide editing capability to the user to edit the media content within the simulated true-to-life preview section; and further comprising a plurality of templates accessible via the work station by the user, wherein each of the templates corresponds to a predefined layout configuration of the media content for a corresponding media platform from among a plurality of media platforms, wherein the templates include a Facebook® template, a Twitter® template, a Linkedin® template, and an Instagram® template.

15. The multi-platform omni-channel content creation and distribution system of claim 14, wherein:

the Facebook® template provides predefined layout configuration and default dimensions for the media content for a Facebook® media platform from among the plurality of media platforms;

the Twitter® template provides predefined layout configuration and default dimensions for the media content for a Twitter® media platform from among the plurality of media platforms;

the Linkedin® template provides predefined layout configuration and default dimensions for the media content for a Linkedin® media platform from among the plurality of media platforms; and the Instagram® template provides predefined layout configuration and default dimensions for the media content for a Instagram® media platform from among the plurality of media platforms.

16. The multi-platform omni-channel content creation and distribution system of claim 15, further comprising a cloud-accessible database configured to store the media content, the Facebook® template, the Twitter® template, the Linkedin® template, and the Instagram® template.

17. The multi-platform omni-channel content creation and distribution system of claim 15, further comprising a pick content type option including a drop down menu having a Twitter® Standard content type and a Twitter® Video content type.

18. The multi-platform omni-channel content creation and distribution system of claim 15, further comprising an indicator shown to a side of the simulated true-to-life preview section that indicates how many remaining characters can be added to a tweet.

19. The multi-platform omni-channel content creation and distribution system of claim 15, further comprising an asset library configured to enforce licensing usage rights of at least one image or video clip.

20. The multi-platform omni-channel content creation and distribution system of claim 19, wherein the asset library is configured to enforce the licensing usage rights by prohibiting access to the at least one image or video clip based on at least one of geography or time.

* * * * *